(12) United States Patent
Aldred et al.

(10) Patent No.: US 6,517,720 B1
(45) Date of Patent: *Feb. 11, 2003

(54) ESCUTCHEON-MOUNTED FILTER WITH ABOVE COUNTER ACCESS FOR CARTRIDGE RENEWAL

(76) Inventors: Jeffrey K. Aldred, 708 17th St., Boulder, CO (US) 80302; Brian D. Hunter, 1895 County Road 68, Nederland, CO (US) 80466; Hermann Schneider, Röntgenstrasse 9, D-54516, Wittlich (DE); Hans Nikolayczik, Röntgenstrasse 9, D-54516, Wittlich (DE); Robert Magyar, One Centennial Ave., P.O. Box 6820, Piscataway, NJ (US) 08855-6820

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,193

(22) Filed: Mar. 4, 1999

Related U.S. Application Data

(63) Continuation-in-part of application No. 09/034,377, filed on Mar. 4, 1998, now abandoned, which is a continuation-in-part of application No. 09/210,189, filed on Dec. 11, 1998, now abandoned.

(51) Int. Cl.[7] ................................ B01D 24/00
(52) U.S. Cl. ................. 210/282; 137/545; 137/547; 137/551; 137/801
(58) Field of Search ................. 137/545, 547, 137/551, 801; 210/282

(56) References Cited

U.S. PATENT DOCUMENTS

| 4,915,831 | A | | 4/1990 | Taylor |
|---|---|---|---|---|
| 5,082,568 | A | | 1/1992 | Holler |
| 5,160,038 | A | | 11/1992 | Harada et al. |
| 5,273,650 | A | | 12/1993 | Vermes et al. |
| 5,510,031 | A | | 4/1996 | Knauf, Jr. et al. |
| 5,545,322 | A | | 8/1996 | Cheng |
| 5,858,215 | A | * | 1/1999 | Burchard |
| 5,983,938 | A | * | 11/1999 | Bowers |
| 6,066,254 | A | | 5/2000 | Huschke et al. |
| 6,183,636 | B1 | | 2/2001 | Bowers et al. |
| RE37,216 | E | | 6/2001 | Koslow |
| 6,325,929 | B1 | | 12/2001 | Bassett |

FOREIGN PATENT DOCUMENTS

EP 0792673 A1 3/1997

* cited by examiner

*Primary Examiner*—Chester T. Barry

(57) ABSTRACT

A filtration cartridge faucet assembly contains a filtration body that is concealed beneath a sink deck through the use of an escutcheon mount. The escutcheon mount permits access to a renewable filtration core from above the sink deck while concealing and protecting the filtration body.

31 Claims, 19 Drawing Sheets

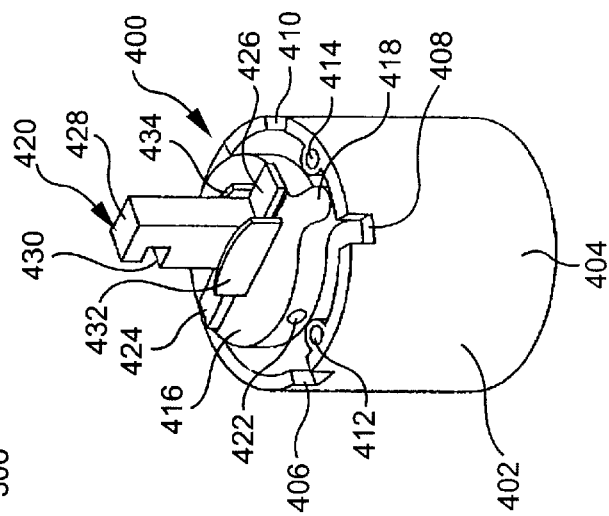
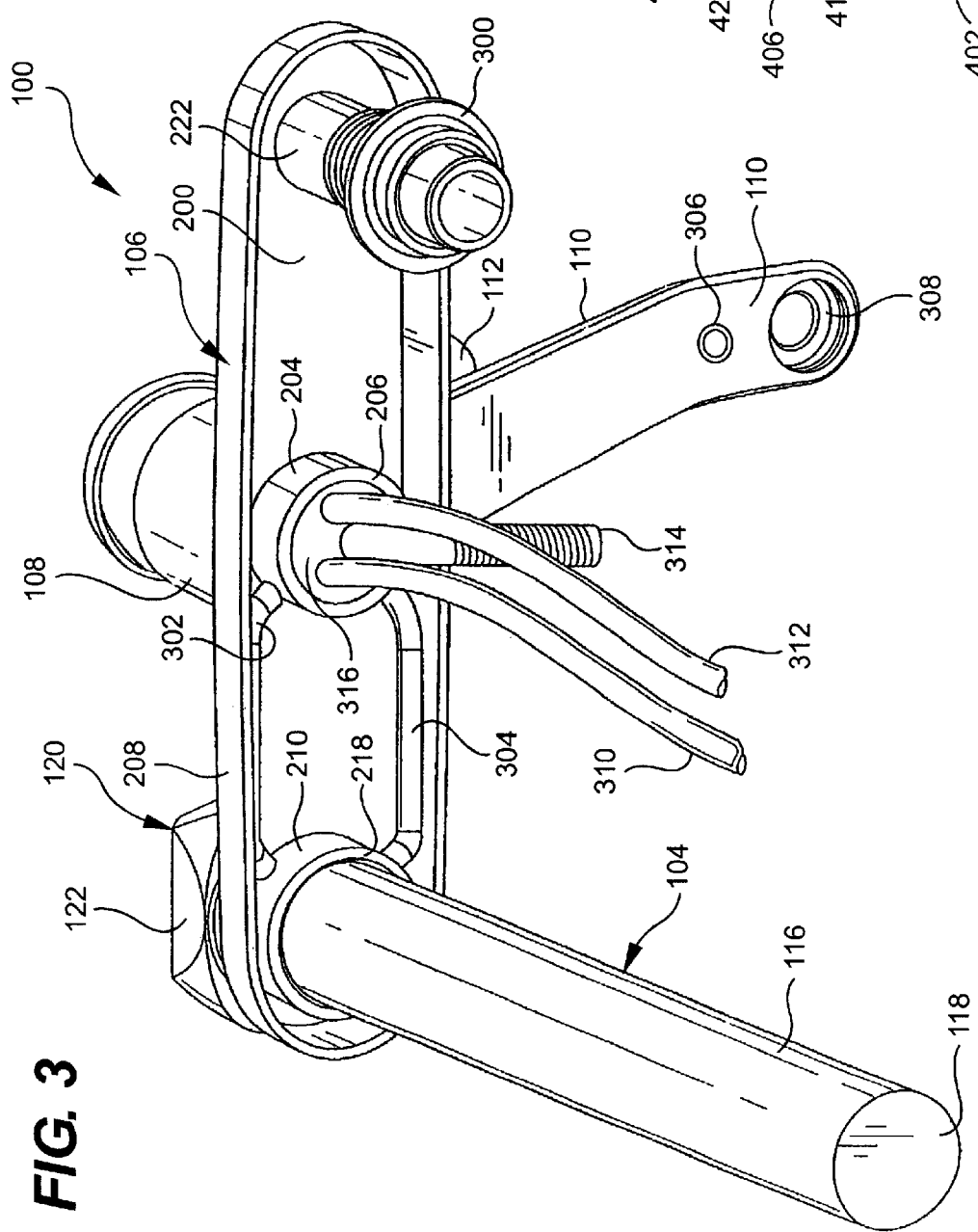

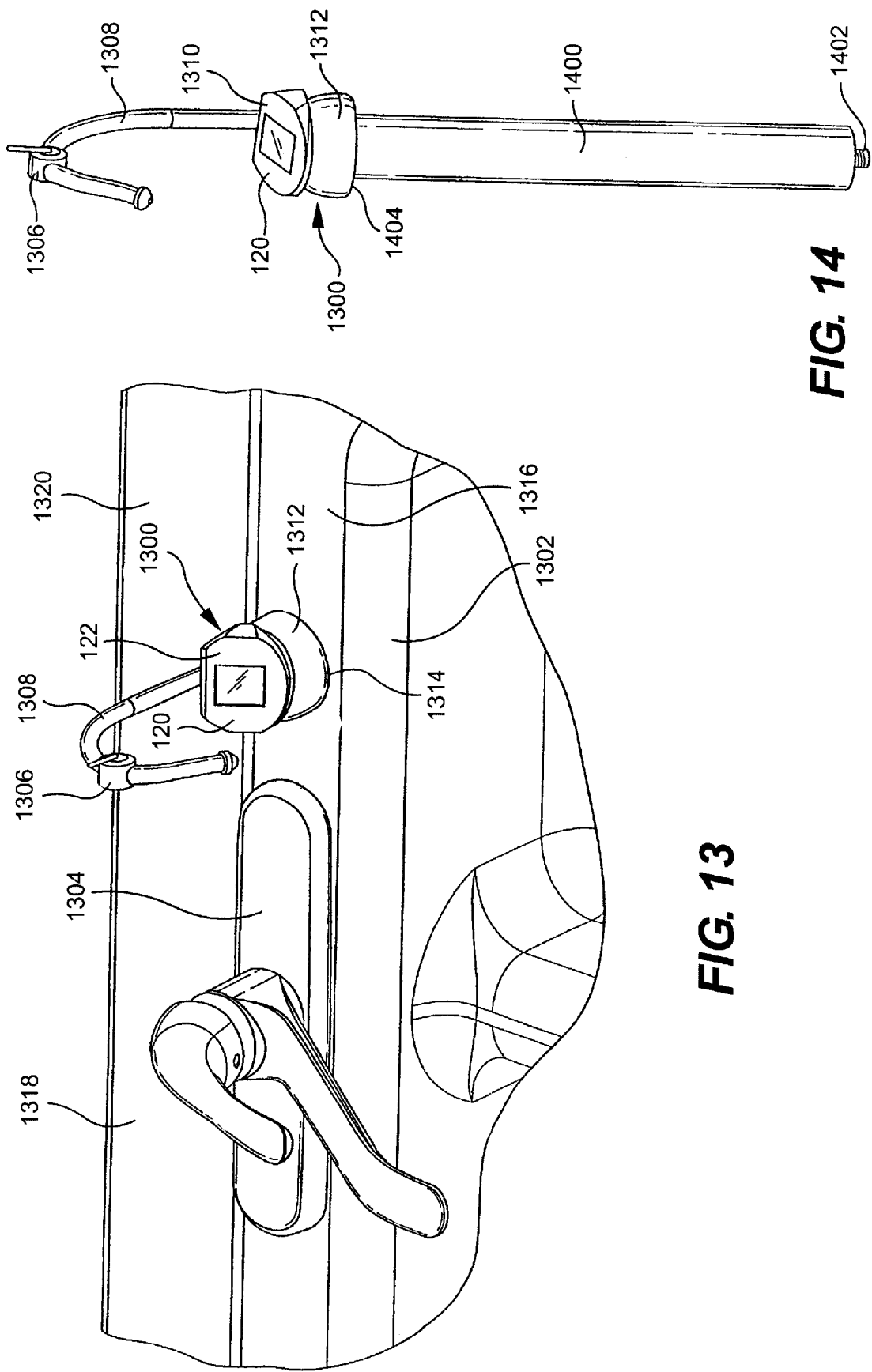

FIG. 23
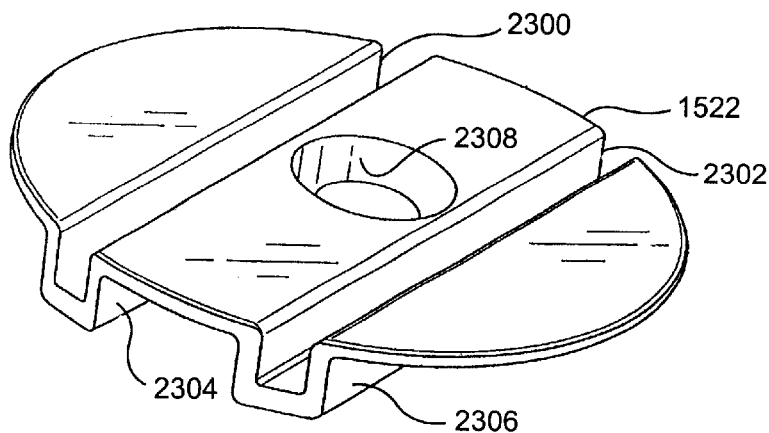
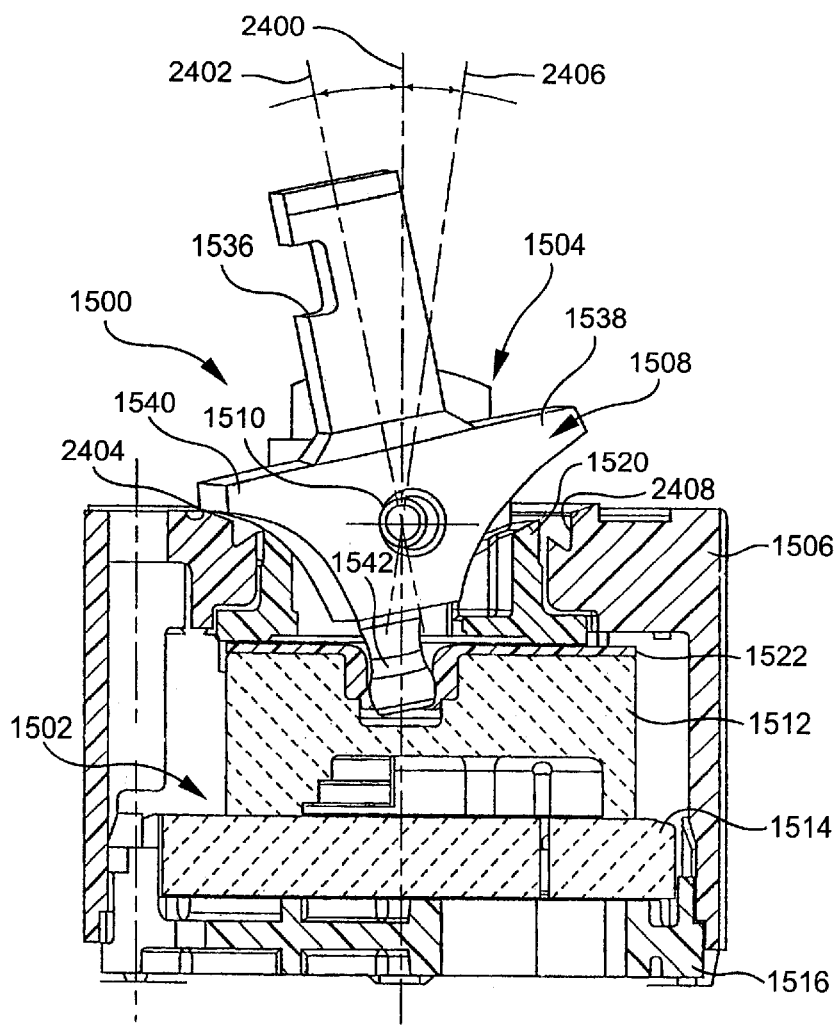
FIG. 24

ESCUTCHEON-MOUNTED FILTER WITH ABOVE COUNTER ACCESS FOR CARTRIDGE RENEWAL

RELATED APPLICATIONS

This Application is a continuation-in-part of application Ser. No. 09/034,377 filed Mar. 4, 1998 and application Ser. No. 09/210,189 filed Dec. 11, 1998, both now abandoned.

BACKGROUND OF THE INVENTION

1. Field of the Invention

The present invention pertains to the field of water filtration or purification devices and, particularly, mounting assemblies that are used to mount renewable filters in proximity to a sink. More specifically, the mounting assemblies are adapted to mount filters in locations that facilitate unhindered use of the sink area, yet the filters can be easily renewed from above the countertop at the end of their useful life.

2. Statement of the Problem

Most water faucets of the type that supply water to a sink do not include a water filtration or purification device. These faucets typically contain a central valve connected to a cold water supply and a hot water supply. The valve is capable of selective actuation to provide hot, cold or warm water for use at the sink. The faucet assemblies typically use screens having relatively large openings to remove correspondingly large particles from the incoming water supply, but no attempt is made to filter small particles or purify the water by chemical means.

Water consumers are increasingly aware that public water supplies are contaminated with many undesirable chemicals and microorganisms which are capable of impairing the health of persons who consume the water. For example, water supplies in rural agricultural areas often contain nitrates and pesticides, which are used to treat crops. Most municipalities add chlorine to guard against pathogens in the public water supply. There is much discussion among experts over what concentrations of chlorine, nitrates, and pesticides are considered to be safe. Generally, it is acknowledged that the water supply would be better without these chemicals. Similarly, water may contain pathogenic microorganisms, such as *rotavirus*, Giardia and Cryptosporidium, which may be removed by filtration and chemical treatment.

Water filtration and purification devices may be purchased and installed for use in combination with sink-mounted water faucets. Paper filters or activated carbon blocks are commonly used as the filtration material. A common technique is to place the water filter in a self-contained housing with an inlet and outlet connected to the cold water supply leading to the faucet. The assembled in-line unit is placed in a compartment beneath the sink where it operates to filter water until the end of its useful life. The filtration element is renewed by unscrewing a cap from the assembly and withdrawing the filtration element for renewal.

The filter renewal procedure is a source of many troubles. The person who performs this renewal procedure must partially crawl into the compartment beneath the sink to renew the cartridge. Other items in the compartment, e.g., paper items, granulated soaps, and tools, must be removed to protect them from spillage as the filter is changed. Leaks may be caused in valves and plumbing connections as a consequence of moving the filter. Over time, the compartment sustains noticeable water damage due to repeated spillage and leaks.

Where in-line systems are not used, the alternative procedure is to place a filter on the countertop or on the faucet discharge. For example, U.S. Pat. No. 5,017,286 shows a faucet-mounted water filter that is secured to the open end of a water faucet. A manually actuatable diverter valve is used to divert water from the main discharge to the filter. Similarly, U.S. Pat. No. 5,656,160 shows a water filter that is mounted on the countertop adjacent the sink. The filter inlet is coupled with the sink faucet through a swivel mounted elbow that is capable of 360 degree rotation. The problem with filters mounted above the counter is that they occupy space in areas of high activity. Faucet mounted filters of the type shown in the '286 patent are subject to damage from items that are being cleaned in the sink, e.g., pans, dishes or turkeys, and the filter may even have to be removed to provide access for large items. Countertop models similarly interfere with desirable access to the sink area.

There remains a need for a filter mounting assembly that permits mounting of a filter proximate a sink without occupying space in the work area adjacent the sink and without the inconvenience of a below sink mount.

SOLUTION

The present invention overcomes the problems that are outlined above and advances the art by providing a filtration cartridge mounting assembly that permits mounting of a filter proximate a sink without occupying space in the work area adjacent the sink and without the mount. Substantially all of the filter is stored beneath the countertop, but the filter is accessed for renewal from a vantage point above the countertop work surface. Even though the filter is concealed beneath the countertop, there is advantageously no need for one to crawl into the compartment beneath the sink for renewal of the cartridge.

A water filtration cartridge assembly according to the invention includes a filtration body for use in the filtration of water. An escutcheon or flange is adapted to mount the filtration body into sink deck openings. The filtration body passes through the escutcheon and the sink deck opening to conceal a substantial portion of the filtration body beneath the countertop. A detachable channel-lock, compression fitting, or threadable coupling is used to connect the filtration body with the escutcheon to provide a sealed assembly without leakage of water when the filtration body is used for filtration of water. The coupling mechanism also permits renewal of the filtration body from an access position above the countertop when the filtration body is not used for filtration of water.

As used in this art, there is sometimes ambiguity as to whether a filter includes only a mechanical filter. Chemical scrubbers, such as activated carbon blocks, are also sometimes referred to as filters. Similarly, beds of chemical treating agents also act as a mechanical filter. In an effort to resolve this ambiguity, the term "filter" is hereby defined to include mechanical filters, beds of chemical scrubbers, beds of chemical treating agents, fluidized beds of particulate treating agents, and any other bed of material that even temporarily has the effect of a mechanical or electrostatic filter.

In preferred embodiments, the filtration body includes a filter core received within an outer sleeve. The outer sleeve has an upper opening of sufficient dimensions to permit passage of the filter core through the upper opening. Thus, the outer sleeve is a permanent part of the mounting assembly, and only the filter core need be replaced at times of cartridge renewal. Less preferred embodiments require replacement of the entire cartridge including the outer sleeve and, consequently, are more wasteful. The filter core preferably has a cylindrical shape including a central axial bed of at least one chemical purification agent surrounded by a radial mechanical filter.

In other preferred embodiments, the escutcheon is specially formed through a water faucet housing. Thus, the filtration body is mounted through the second or third hole in a sink beneath the housing where the first hole is a conventional central hole beneath the faucet valve assembly. An especially preferred feature of this embodiment is the use of a selectively actuatable valve that is coupled with the filtration body to provide flow of filtered or unfiltered water depending upon the selective positioning of the valve.

The escutcheon may also be a specially made flange adapted to retain the filtration body within a soap hole in a sink, i.e., what is conventionally referred to as the fourth hole.

BRIEF DESCRIPTION OF THE DRAWINGS

FIG. 3 depicts bottom rear perspective view of the filtration cartridge faucet assembly;

FIG. 4 depicts a top elevational perspective view of a five way valve for use in selectively providing filtered water from the filtration cartridge faucet assembly;

FIG. 13 depicts a right front perspective elevational view of a filtration cartridge faucet assembly corresponding to a second embodiment of the invention; and FIG. 14 depicts additional detail with respect to the second embodiment of FIG. 13.

FIG. 23 depicts a top perspective view of a force transfer plate for use in the valve assembly of FIG. 15;

FIG. 24 depicts a midsectional view of the assembled valve corresponding to FIG. 15 with a mechanism for limiting vertical rocking motion of a cam lever;

DETAILED DESCRIPTION OF THE PREFERRED EMBODIMENT

Figure 1:
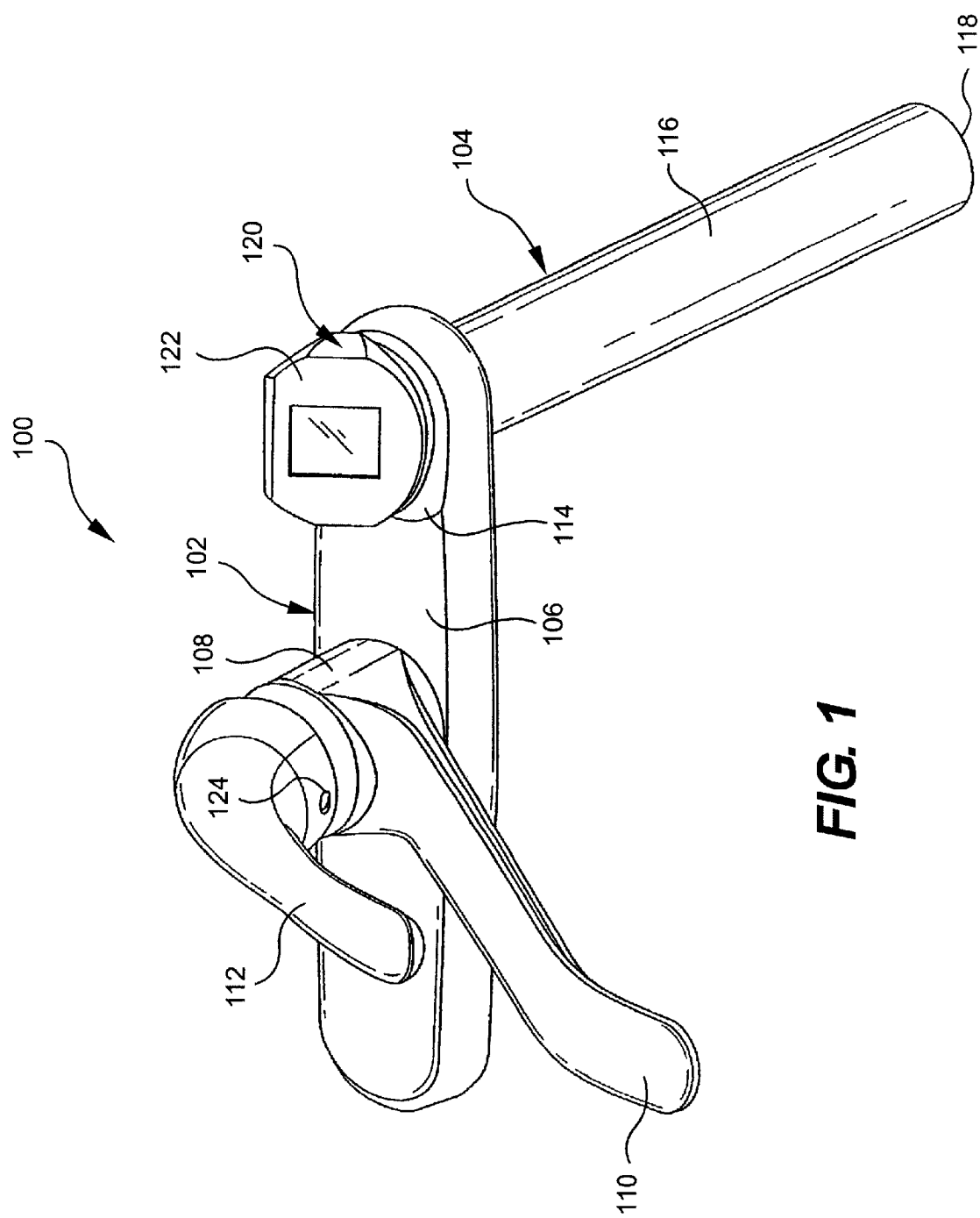
FIG. 1 depicts a right front perspective elevational view of a filtration cartridge faucet assembly corresponding to a first embodiment of the invention.

FIG. 1 depicts a front, right, top elevational perspective view of a first embodiment of the invention, namely, filtration cartridge faucet assembly 100. Filtration cartridge faucet assembly 100 includes a water faucet assembly 102 and a filtration body 104. The major components of water faucet assembly 102 include an ovaloid faucet housing 106, a valve body 108 which is integrally formed with spout 110, and a handle 112. Valve body 108 is capable of rotation on a vertically oriented axis, with the rotation shifting spout 110 to selected positions on the right or left, e.g., as to dispense water in different sides of a sink (not depicted in FIG. 1). An escutcheon 114 adapts filtration body 104 for coupling with faucet housing 106.

Handle 112 is internally connected to an interior valve within valve body 108, and is selectively positionable to dispense unfiltered hot, cold, or warm water from spout 110 through valve body 108 in a conventional manner. Handle 112 is also selectively positionable to provide cold water to filtration body 104, and the filtered water is returned to spout 110 for point-of-use dispensation of filtered water.

Filtration body 104 contains a cylindrical outer sleeve 116 having a closed distal end 118. A cylindrical, axially elongated filter core 120 fills the interior side of outer sleeve 116. An end of life indicator 122 also serves as a cap for the filter core, and detachably locks filter core 120 in place while interior seals prevent leakage from between escutcheon 114 and filtration body 104.

Figure 2:
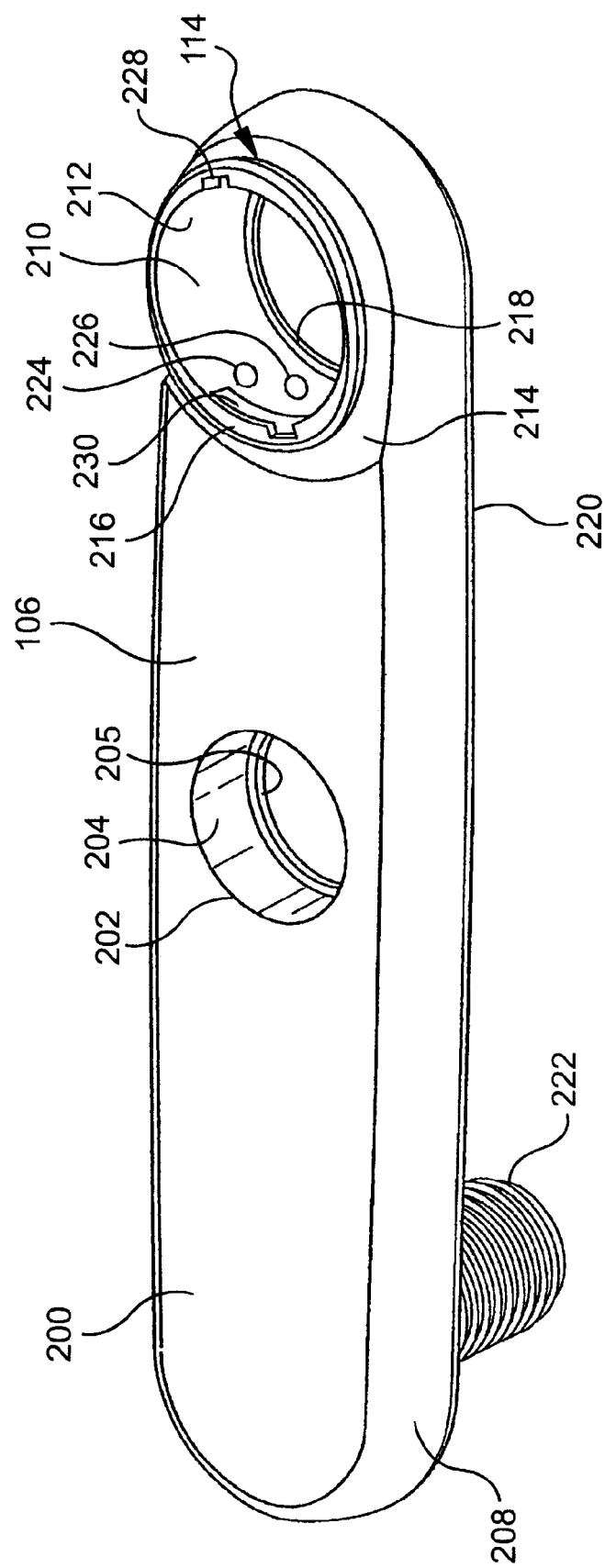
FIG. 2 depicts a faucet housing including an escutcheon mount for use in the FIG. 1 embodiment.

FIG. 2 provides additional detail with respect to faucet housing 106, which is depicted from a top, right, elevational perspective. Housing 106 includes a flat upper wall 200 through which there is formed a central circular aperture 202 for the passage of conventional water supply lines. A vertically oriented cylindrical sidewall 204 with a radially inboard extending rim 206 is used for coupling faucet housing 106 with valve body 108 (see FIG. 1). An arcuate lip 208 curves downwardly from surface 200.

Escutcheon 114 includes a cylindrical vertical sidewall 210 surrounding aperture 212, which passes through wall 200 and sidewall 210. An arcuate ramp 214 provides an easy-to-clean surface rising from upper wall 200 to a cylindrical rim 216. The lower portion of sidewall 210 provides a ring-like lip 218, which travels from sidewall 210 in a radially inboard direction to narrow the diameter of aperture 212.

Sidewall 210 preferably has a height that places the bottom of ring-like lip 212 at a height that is equal to or higher than the elevation corresponding to the bottom 220 of arcuate lip 204. This height dimension permits filtration body 104 (see FIG. 1) to have a maximum outer diameter corresponding to a conventional third hole in a sink deck (not depicted in FIG. 2) without requiring sidewall 210 to pass through the third hole. A threaded nipple 222 is configured to pass through the second hole of a conventional sink deck to lock faucet housing in place for its intended use.

Water outlet orifice 224 and water inlet orifice 226 pass through sidewall 210. Outlet orifice 224 is at a higher elevation than inlet orifice 226. Sidewall 210 contains a pair of recessed slots 228 and 230, which are used to engage corresponding channels in cap end of life indicator 122 (see FIG. 1) for retention of filter core 120 within escutcheon 114.

FIG. 3 depicts filtration cartridge faucet assembly 100 from a right rear bottom elevational perspective view. A plate nut 300 threadably engages nipple 222 to secure housing 106 in position above a conventional sink deck (not depicted in FIG. 3). Filtered water line 302 connects filtration outlet orifice 224 (see FIG. 2) with spout 110 through sidewall 204. The internal flow channels of assembly 100 within valve body 108 are such that filtered water from filtered water line 302 travels through valve body 108 and spout 110 to discharge from spout 110 at orifice 3067 which permits the passage of water through a separate sanitary system apart from the main discharge orifice 308 for unfiltered water. Filtration water supply line 304 connects filtration inlet orifice 226 with a valve internal to sidewall 204 and valve body 108. A copper cold water supply line 310 and a copper hot water supply line 312 are conventional water supply lines for the distribution and delivery of water. A brass stem 314 is optionally used as a conventional sprayer attachment. Supply lines 310 and 312, as well as stem 314, are coupled with end plate 316 for transmission of water to the internal portion of valve body 108.

FIG. 4 depicts a top perspective view of a five way valve 400 that fits within valve body 108. An inverted cup-shaped housing 402 includes an outer cylindrical wall 404 having a plurality of rectangular notches 406, 408, and 410, which permit runoff of excess water or leakage. A plurality of holes, e.g., holes 412 and 414 are spaced equally around the perimeter of wall 404, and extend through wall 404. The holes 412 and 414 permit the passage of bolts or screws through wall 404 to couple housing 402 and valve 400 in sealing engagement with end plate 316 (see FIG. 3).

A central turntable 416 protrudes through and is pressed into sealing engagement with housing 402. Turntable 416 is rotatable within a horizontal plane relative to housing 402. A wing 418 extends to the side of turntable 416 to prevent over rotation of turntable 416 by abutment against inwardly protruding bosses surrounding holes 412 and 414.

A four-armed rocking cam lever 420 is centrally positioned with respect to turntable 416. Cam lever 420 is free to pivot over a limited arc around pin 422, which protrudes through turntable 416. Arms 424 and 426 limit the arc of rotation around pin 422 by abutment against turntable 426. Upward arm 428 has a notch 430 for corresponding engagement with set screw 124 of handle 112 (see FIG. 1). Upward arm 428 is used to transfer horizontal rotational motions from handle 112 to turntable 416, as well as vertical rocking motions from handle 112 to interior valve components within housing 404. A fourth arm of cam lever 420 and a corresponding compression spring are hidden from view in FIG. 4, but passes into the interior spaces of housing 402 extending directly away from and parallel to upward arm 428. This fourth arm is used to contact the aforementioned interior valve components within housing 402. Ears 432 and 434 are used to stabilize cam lever 420 against lateral motion parallel to the axis defined by pin 422.

Figure 5:
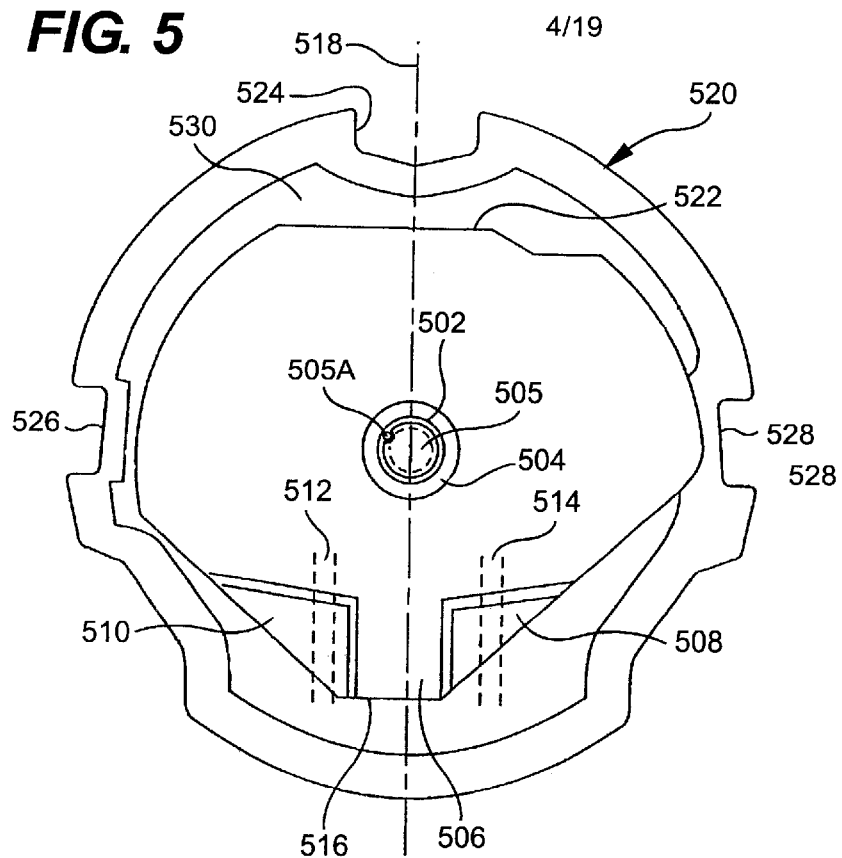
FIG. 5 depicts a top plan view of internal components for use in the five way valve, where the internal components include a top plate and a bottom plate.

FIG. 5 depicts a top plan view of two ceramic plates that form the interior valve components of five way valve 400. Top plate 500 includes a rounded cylindrical recess 502 having an inward taper 504 for receipt of the fourth arm 505 of cam lever 420. Fourth arm 505 is shown in phantom in FIG. 5 because fourth arm 505 is actually part of cam lever 420. Top plate 500 has a nose 506 in which is formed a pair of upwardly tapered bevels 508 and 510. These bevels 508 and 510 each abut a corresponding rail 512 and 514, which are shown in phantom in FIG. 5 because rails 512 and 514 are integrally formed as an interior feature of housing 402. Rails 512 and 514 function as a lateral motion constraint that forces the motion of point 516 to lie along imaginary translational axis 518 as top plate 500 slides in horizontal motion relative to bottom plate 520. Thus, the remote end 522 of top plate 520 is free to pivot in an horizontal arc relative to point 516 while point 516 is forced into substantial alignment with the track defined by imaginary axis 518.

Bottom plate 520 has an outer perimeter in which there is formed a plurality of notches 524, 526, and 528 for engaging corresponding structure within housing 402 (see FIG. 4). This engagement with notches 524, 526, and 528 locks bottom plate in place relative to housing 402. A central, upwardly raised, flat sliding surface 530 is coated with a hydrophobic silicon-based grease to facilitate a watertight seal.

Figure 6:
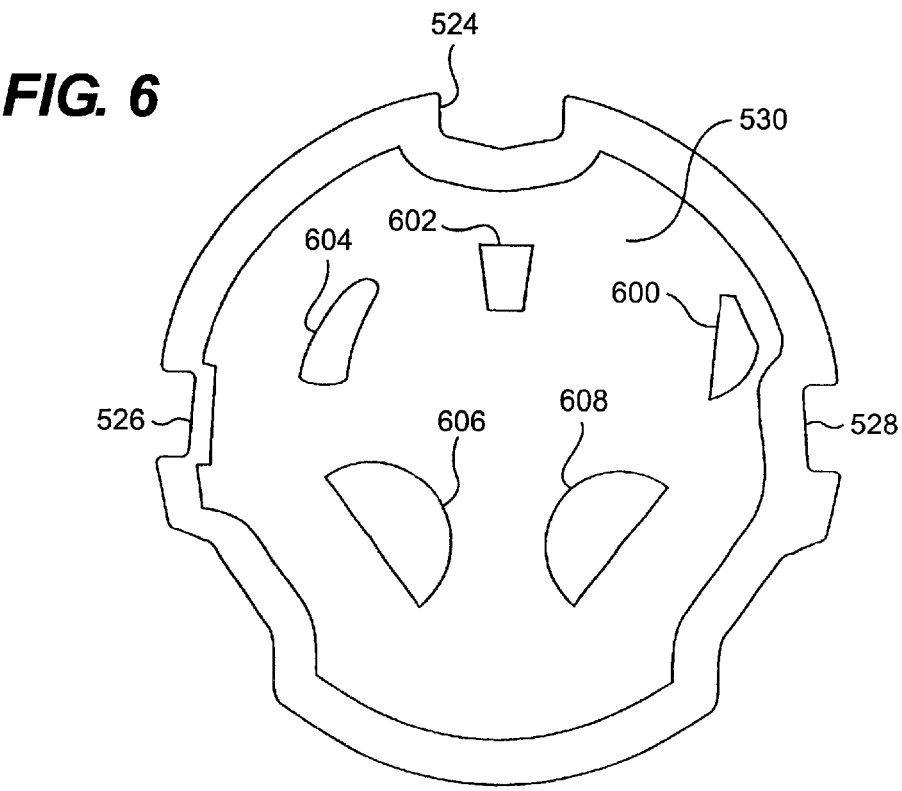
FIG. 6 depicts a top plan view of the bottom plate for use in the five way valve.

FIG. 6 is a top plan view that provides additional detail with respect to bottom plate 520. In FIG. 5, top plate 500 has been removed with respect to FIG. 5 to reveal a plurality of openings that pass completely through bottom plate 520. In combination, these openings form interior flow passageways within five way valve 400 that ultimately permit the flow of hot water, cold water, cold water to filter, and mixed water through spout 110. Openings 600 and 602 are intended to be connected to a cold water supply. Opening 604 is intended to be connected to a hot water supply. Opening 606 is used to carry water from openings 602 and 604 for delivery from main discharge orifice 308 of spout 110 (see FIG. 3). Opening 608 is intended to discharge cold water from opening 600 to filtration water supply line 304 and filtration body 104 (see FIG. 3).

Figure 7:
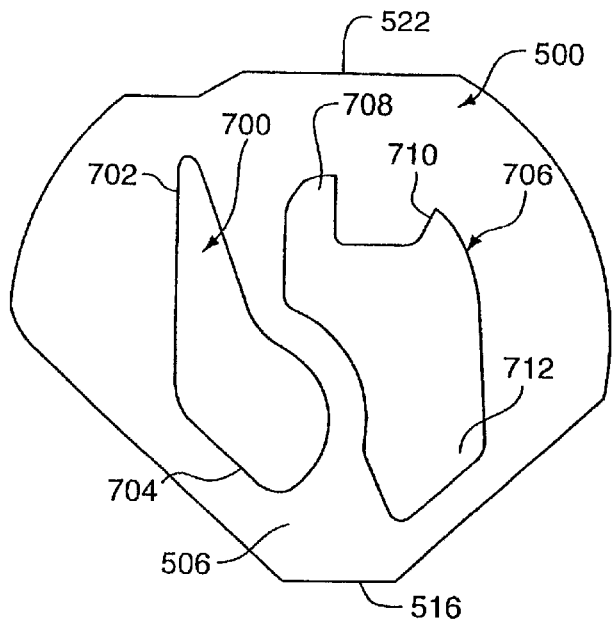
FIG. 7 depicts a bottom plan view of the top plate for use in the five way valve.

FIG. 7 is a bottom plan view that provides additional detail with respect to top plate 500. Top plate 500 has a first irregularly shaped recess 700, which includes a tapered section 702 and a rounded section 704. Recess 700 functions as a via that permits the passage of cold water for filtration. The tapered section 702 is configured to overlie cold water opening 600 in bottom plate 520 (see FIG. 6) while the rounded section 704 overlies opening 608 for the discharge of filtration water. Thus, a temporary flow passage is formed for filtration water by the position of top plate 500 relative to bottom plate 520.

A second irregularly shaped recess 706 is configured to make it impossible for recess 706 to flow water through opening 606 at the same time that recess 702 is positioned to permit flow of filtration water through opening 608 (see FIG. 6). A dogleg feature 708 and a point 710 are adapted to overlie openings 602 and 604 while a remote end 712 overlies opening 606. In this manner, the dogleg feature 708 overlies opening 602 and point 706 overlies opening 604 while the remote end 712 overlies opening 606 to permit selective flow of hot, cold or mixed warm water through opening 606.

Figure 8:
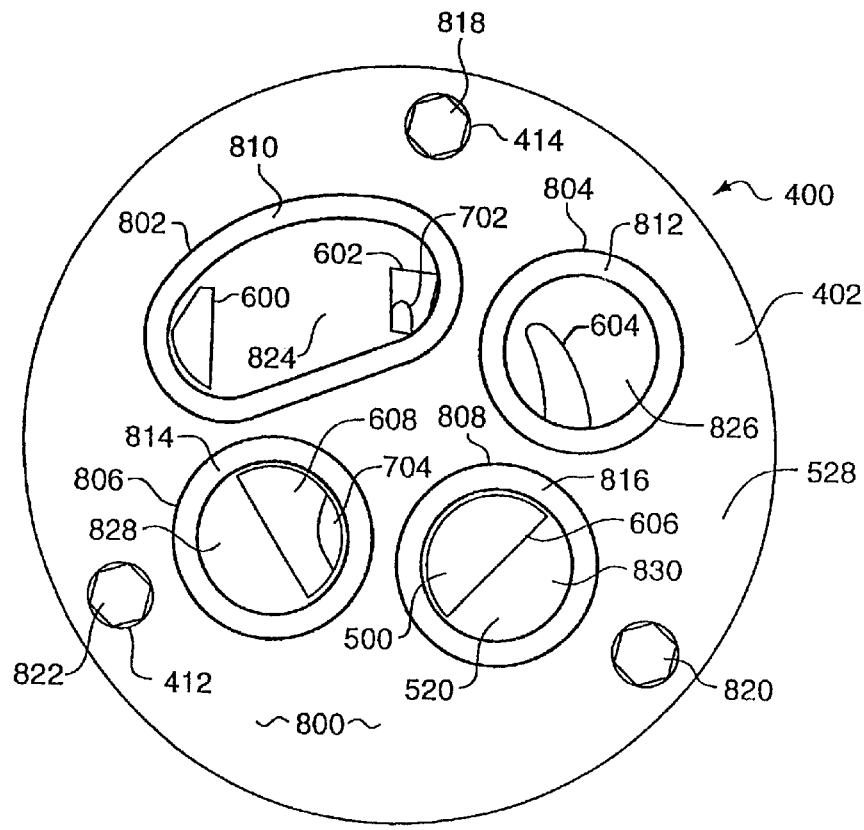
FIG. 8 depicts a bottom plan view of the five way valve depicted in FIG. 4.

FIG. 8 depicts a bottom plan view of the assembled five way valve 400. Housing 402 includes a bottom wall 800 having a plurality of openings formed therein to permit passage of water. A cold water opening 802 is in communication with cold water supply line 310 (see FIG. 3), opening 600 and opening 602. A hot water opening 804 is in communication with hot water supply line 312 (see FIG. 3) and opening 604. A filtration water discharge opening 806 is in communication with filtration water supply line 304 (see FIG. 3) and opening 608. A mixed water discharge opening 808 is in communication with main discharge orifice 308 (see FIG. 3) and opening 606. A plurality of elastomeric bands having a rectangular crossection function as seals 810, 812, 814, and 816, which prevent water leakage under the tensile strain exerted by bolts 818, 820 and 822 to compress housing 420 into end plate 316 (see FIG. 3). A plurality of frustoconical recesses 824, 826, 828, and 830 are formed in bottom plate 520 to convey water to the respective openings 600–608. As depicted in FIG. 8, top plate 500 is selectively positioned relative to bottom plate 520 in a configuration that places tapered section 702 over opening 600 and rounded section 704 over opening 608 for the discharge of filtration water.

The foregoing discussion demonstrates that five way valve 400 is selectively positioned by actuation of handle 112 to provide these five flow configurations:

(1) Flow of cold water from opening 600 to opening 608 for filtration;
(2) Flow of cold water from opening 602 to opening 606 for discharge of unfiltered cold water;
(3) Flow of hot water from opening 604 to opening 606 for discharge of unfiltered hot water;
(4) Simultaneous flow of cold water from opening 602 and hot water from opening 604 to opening 606 for discharge of unfiltered mixed or warm temperature water; and
(5) No flow with top plate 500 of valve 400 positioned to block flow, i.e., in an off position.

Figure 9:
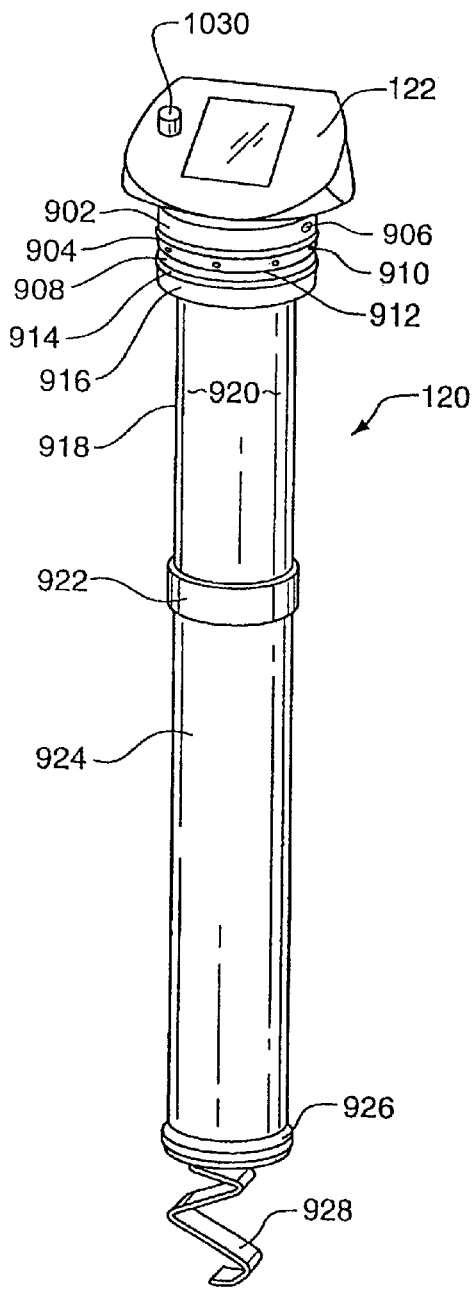
FIG. 9 depicts a renewable filtration core for use in the FIG. 1 embodiment.

FIG. 9 depicts additional detail with respect to a cylindrical filter core 120 (see FIG. 1). End of life indicator 122 functions as a twist handle for axial rotation of filter core 120. In a vertically descending sequence, the exterior portion of end of life indicator 122 includes a first cylindrical lip 902 above an O-ring-retaining channel 904. A pair of diametrically opposed protrusions, e.g., protrusion 906, are formed above the first cylindrical lip 902. The protrusions have sufficient dimensions to fit within recessed slots 228 and 230 for corresponding interengagement with and retention of filter core 122 within escutcheon 114 (see FIG. 2). This interengagement also retains the filter core 120 within the filtration body 104 (see FIG. 1). A second cylindrical lip 908 contains a plurality of perforations, e.g., perforations 910 and 912, leading to the interior of end of life indicator 122. A second O-ring channel 914 exists beneath second cylindrical lip 908. A third cylindrical lip 916 has a greater diameter than does tube 918, which is ultrasonically welded or adhered to end of life indicator 122.

Tube 918 has an impermeable wall 920 connecting third cylindrical lip 916 with a lower flared shoulder 922. Shoulder 922 has a sufficient internal diameter to receive a tubular mechanical filter 924. Mechanical filter 924 is adhered to shoulder 922, and can be a paper or cardboard filter to strain sediments, or it can be a microfilter that removes pathogenic bacterial or even viruses from the water. In low-sediment environments of use, a particle filter capable of removing 0.22 micron particles will remove substantially all pathogenic bacterial contaminants, but this size of filter clogs quickly in moderately sedimented environments. A one micron filter removes substantially all protozoa and does not clog as easily as the 0.22 micron filter. A five micron filter removes only sediments, and does not protect against protozoa. The filter is selectively sized for the intended environment of use.

A plastic plug 926 is adhered to the bottom portion of mechanical filter 924 to prevent water from bypassing the filter. A leaf spring 928 places a compressive force on mechanical filter 924 and tube 918 to enhance the interengagement between protrusion 906 its corresponding recessed slot 228.

Figure 10:
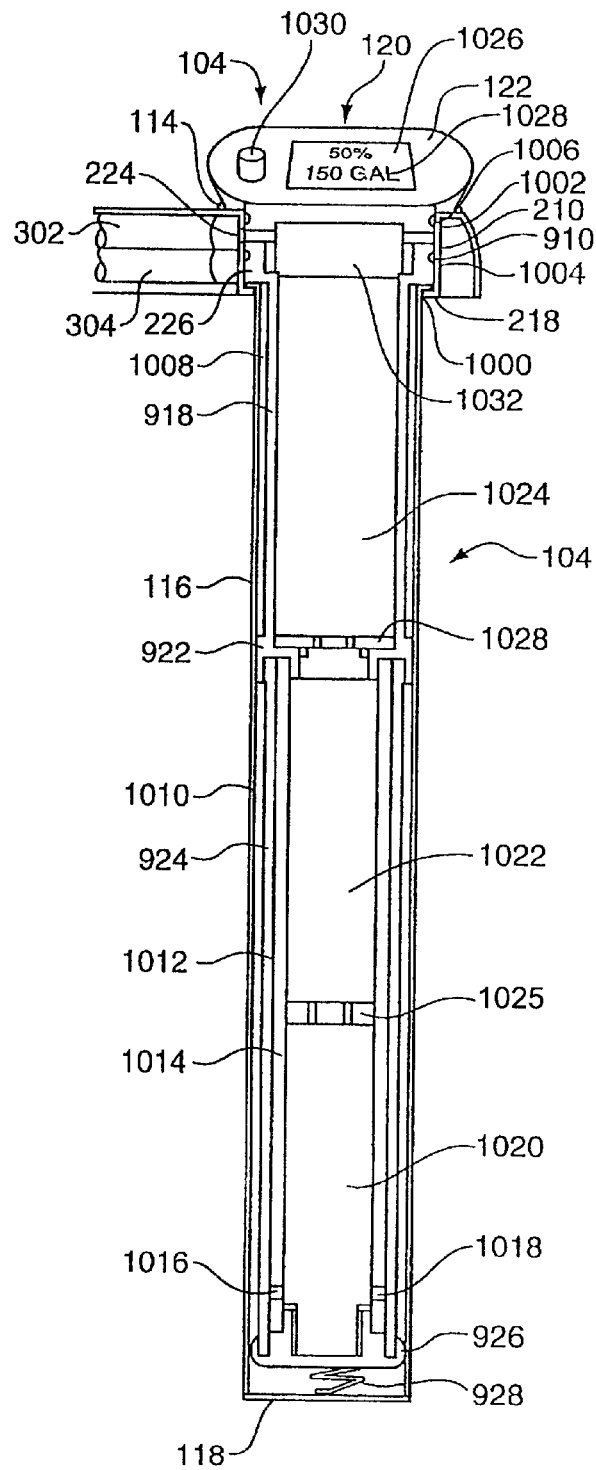
FIG. 10 depicts a midsectional view of the filtration core installed in a filtration assembly.

FIG. 10 depicts a midsectional view of filtration body 104 installed in escutcheon 114. As indicated above, filtration body 104 includes a cylindrical outer sleeve 116 with a having a closed distal end 118. Filter core 120 fills the interior of outer sleeve 116. Outer sleeve 116 has a radially outward extending horizontal upper lip 1000 that is welded or adhered to the ring-like lip 218 of escutcheon 114 where the junction of upper lip 1000 and lip 218 forms a water-tight seal. O-rings 1002 and 1004 engage wall 210 to form water tight seals above and below the perforations including perforation 910. The perforations including perforation 910 are aligned with water outlet orifice 224 and filtered water line 302 for supply of water to filtered water orifice 306 after internal travel within spout 110 (see FIG. 3). The discharged filtered water passes through the space 1006 between O-rings 1002 and 1004. Similarly, water inlet orifice 226 is aligned with filtration water supply line 304 for passage of water beneath O-ring 1004.

The water from filtration water supply line 304 passes through water inlet orifice 226 and into an annulus or plenum 1008 where the water flows in an axial downward direction past tube 918, past shoulder 922, and into lower plenum 1010 adjacent mechanical filter 924. The water changes flow direction ninety degrees to flow in a radially inboard direction through mechanical filter 924 and into interior plenum 1012, which exists between mechanical filter 924 and an impermeable inner sleeve 1014. The flow again changes direction ninety degrees to flow axially downward to perforations 1016 and 1018, which transfer the water interior to inner sleeve 1014. End cap 926 is adhered to the inner circumference of inner sleeve 1014 and mechanical filter 924 to prevent water from bypassing the filter 924.

With the conversion from radial flow to axial flow now complete, a first stacked axial bed 1020 is the first bed in a series of stacked axial beds including beds 1020, 1022, and 1024. These beds include a plurality of sequential beds comprising chemical scrubbing and purification agents. For example, bed 1020 can be a bed of KDF™ material, which functions as an extremely good chlorine scrubber and also demonstrates antimicrobial activity. The KDF™ material is a commercially available product produced by KDF Company of Constantine Michigan. The KDF™ material is a proprietary mixture of zinc and copper that is heated and flaked into tiny pieces. The material permits an exchange of ions due to an oxidation reduction process. The KDF™ material also has bactericidal effects, as described in U.S. Pat. No. 5,415,770. Alternatively, bed 1020 can be a bacteriostatic carbon, such as a silver impregnated carbon. Bed 1022 can be activated carbon to remove pesticides and other undesirable chemicals. Bed 1024 can include a flavor enhancer, such as calcium carbonate. Alternatively, bed 1020 can contain an antimicrobial agent, e.g., an iodinated ion exchange resin, while bed 1022 is activated carbon to scrub the iodine from the water. Any one of these beds can be compressed with fill or packed with particulates to an approximate 80% fill volume to provide a fluidized bed of the treating agent. The respective beds are separated by perforated disks 1026 and 1028. The flow of water proceeds axially upward through beds 1020–1024 and into region 1032 for entry into the end of life indicator 122. In turn, end of life indicator 122 discharges the water through the perforations 910, through orifice 224, and into filtered water line 302 (see FIG. 3).

A preferred feature of the invention is to incorporate antibacterial agents, such as the aforementioned KDF™ material, into the mechanical filter 924 and the stacked axial beds 1020–1024. These materials, as well as other known antimicrobial agents, exhibit antimicrobial activity that prevents bacteria from growing through the mechanical filter 924. The use of antimicrobial agents can substantially prolong filter life where filter 924 is a microfilter. Where the antimicrobial agent places undesirable bactericides into the water, as in the case of iodinated ion exchanged resins, an activated carbon bed may be used to scrub the bactericide from the filtered water.

End of life indicator 122 includes a liquid crystal display 1026 that provides a readout and is activated by push-button 1030. The end of life indicator 122 is battery powered, and push-button 1030 is provided to conserve battery power by activating the display only when readout is necessary. The readout identifies how many gallons of water have passed through filtration body 104 and percentagewise how much of the useful cartridge life is left in filtration core 120.

As to alternative embodiments, those skilled in the art will appreciate that a conventional threaded nipple can be installed in end plate 118 to receive water from filtration water supply line 304, as opposed to receiving water from perforations 910 and 912. Furthermore, the end of life indicator can be replaced by a screw-on cap or other device for locking and sealing the upper \end of the cartridge in an operational manner.

Figure 11:
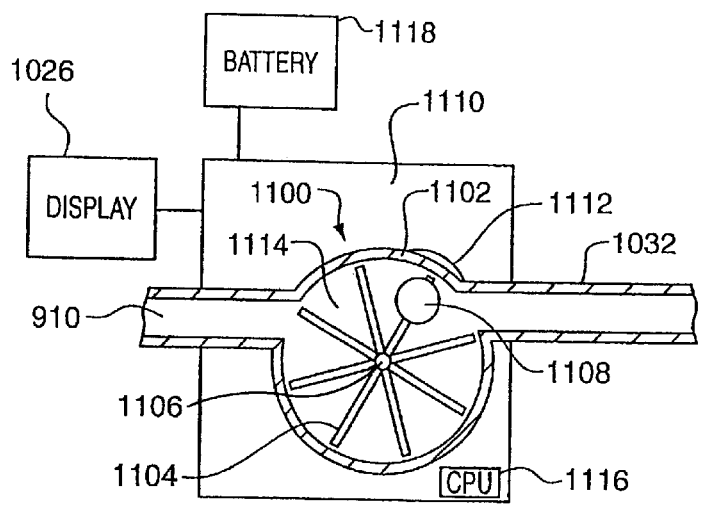
FIG. 11 depicts a generalized end of life indicator mechanism together with a schematic circuit diagram.

FIG. 11 depicts a schematic circuit diagram in combination with a generalized midsectional view of a paddle wheel flowmeter assembly 1100 installed in filter core 120 for use in combination with end of life indicator 122. A cylindrical housing 1102 receives water from region 1032. Housing 1102 contains paddle wheel 1104, which is retained by a vertically oriented pin 1106. A magnet 1108 is attached to one of the paddles of paddle wheel 1104. Printed circuit board 1110 holds an induction coil 1112, which functions as a Hall effect sensor or pickoff to detect the passing of magnet 1108 concomitant with the rotation of paddle wheel 1104 due to the action of water passing through interior cavity 1114. Coil 1112 is mounted on printed circuit board 1110 externally to housing 1102. Printed circuit board 1110 contains a small processor 1116, which cumulates a totalized flow volume corresponding to the rotation of paddle wheel 1104, as is cyclically detected by the Hall-effect magnet-induced current in coil 1112. Printed circuit board 1110 passes the calculation results to display 1026 for push-button access when button 1030 is depressed. A battery 1118 provides power to assembly 1110, and is preferably mounted in the filtration core 120 (see FIG. 1).

Figure 12:
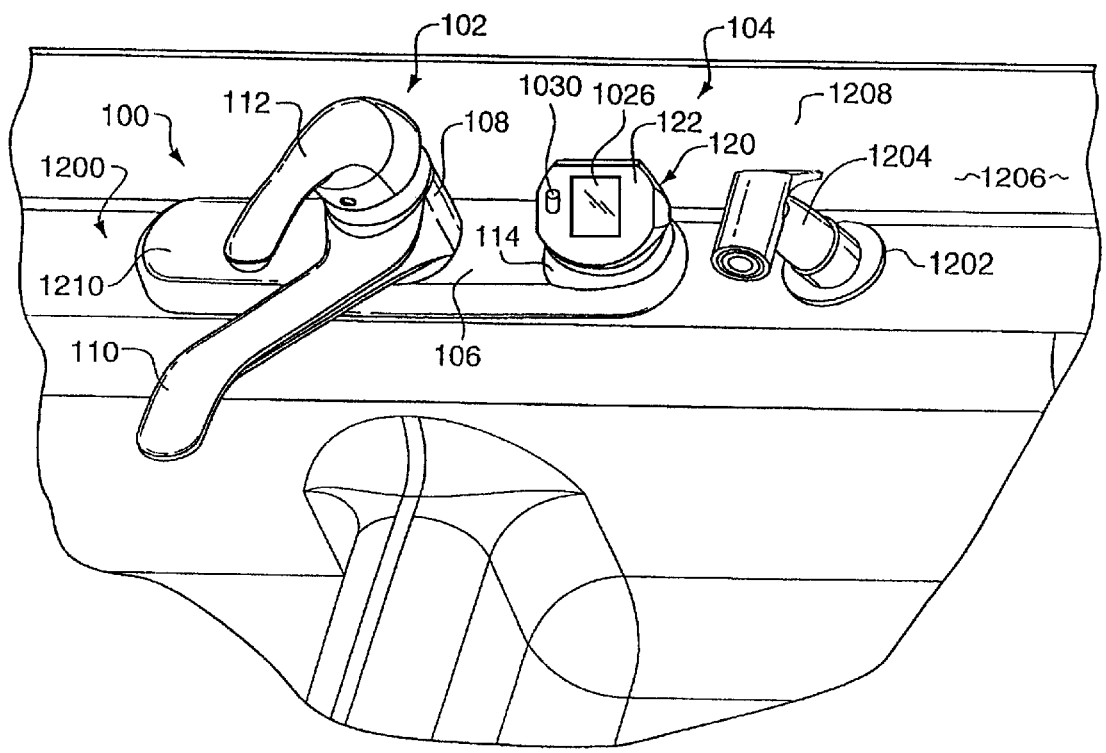
FIG. 12 depicts the filtration cartridge faucet assembly mounted on a sink deck.

FIG. 12 depicts the filtration cartridge faucet assembly 100 mounted on a sink deck 1200, which has a conventional fourth hole opening 1202 for use with a conventional vegetable sprayer 1204. The installation places substantially all of filtration body 104 beneath the working surface 1206 of counter 1208. A person who desires to renew filtration core 120 merely needs to grasp end of life indicator 122 and twist counterclockwise. The bias of leaf spring 928 (see FIG. 9) pushes filter core upward when protrusion 910 disengages slot 928. Filter core 120 can be lifted out of sleeve 116 from a position entirely above counter 1208, and a new filter core is substituted in its place. These design features permit use of the filter from a location substantially beneath counter 1208 while permitting renewal from a position above counter 1208.

Those skilled in the art will appreciate that a second faucet can be provided in position 1210 above the second hole of the sink deck by merely connecting filtered water line to the second faucet for discharge of filtered water from position 1210, as opposed to discharge from orifice 306. Similarly, a second faucet may be installed in place of vegetable sprayer 1204. The concept of a fourth hole mount in place of vegetable sprayer 1204 may be expanded to include a retrofit assembly controlled by its own valve atop filtration body 104. The retrofit assembly could incorporate end of life indicator 122 as part of the faucet.

FIG. 13 depicts a second embodiment of the invention, namely, a fourth hole mounted faucet filter 1300. The fourth hole mounted faucet filter assembly 1300 is designed as a retrofit assembly to equip a conventional sink with a filtration device. Thus, sink 1302 is equipped with a conventional non-filtering faucet 1304. Faucet filter assembly 1300 is substantially identical to the filtration body of filtration cartridge faucet assembly 100, except assembly 1300 contains a separate valve 1306 and associated discharge line 1308. The same filter core 120 including end of life indicator 122 may be used in either assembly 100 or assembly 1300. An escutcheon 1312 adapts assembly 1300 for mounting in the fourth hole 1314 of sink deck 1316 to place the majority portion of assembly 1300 where it is hidden from view beneath working surface 1318 of counter 1320.

FIG. 14 provides additional detail with respect to features of assembly 1300 that are hidden from view in FIG. 13. An outer sleeve 1400 differs from outer sleeve 116 in FIG. 1 by virtue of inlet nipple 1402. Inlet nipple 1402 replaces filtration water supply line 304 shown in FIG. 3 for direct discharge of water into plenum 1010 beneath leaf spring 928. Similarly, with respect to FIG. 3, filtered water flowing from the perforations including perforation 910 is gathered for discharge into discharge line 1308, as opposed to filtered water line 302.

It is preferred that the bottom surface 1404 of escutcheon 1312 have a strong adhesive providing means for adhering escutcheon 1312 to sink deck 1316 (see FIG. 13). A threaded escutcheon backed by a plate nut beneath the sink deck would also work for purposes of the invention, but the corresponding need to pass a threaded nipple through the fourth hole 1314 would required narrowing the diameter of outer sleeve 1400. The narrow diameter would necessitate the placement of a correspondingly lower volume of filtration and/or purification material in filter core 120.

Figure 15:
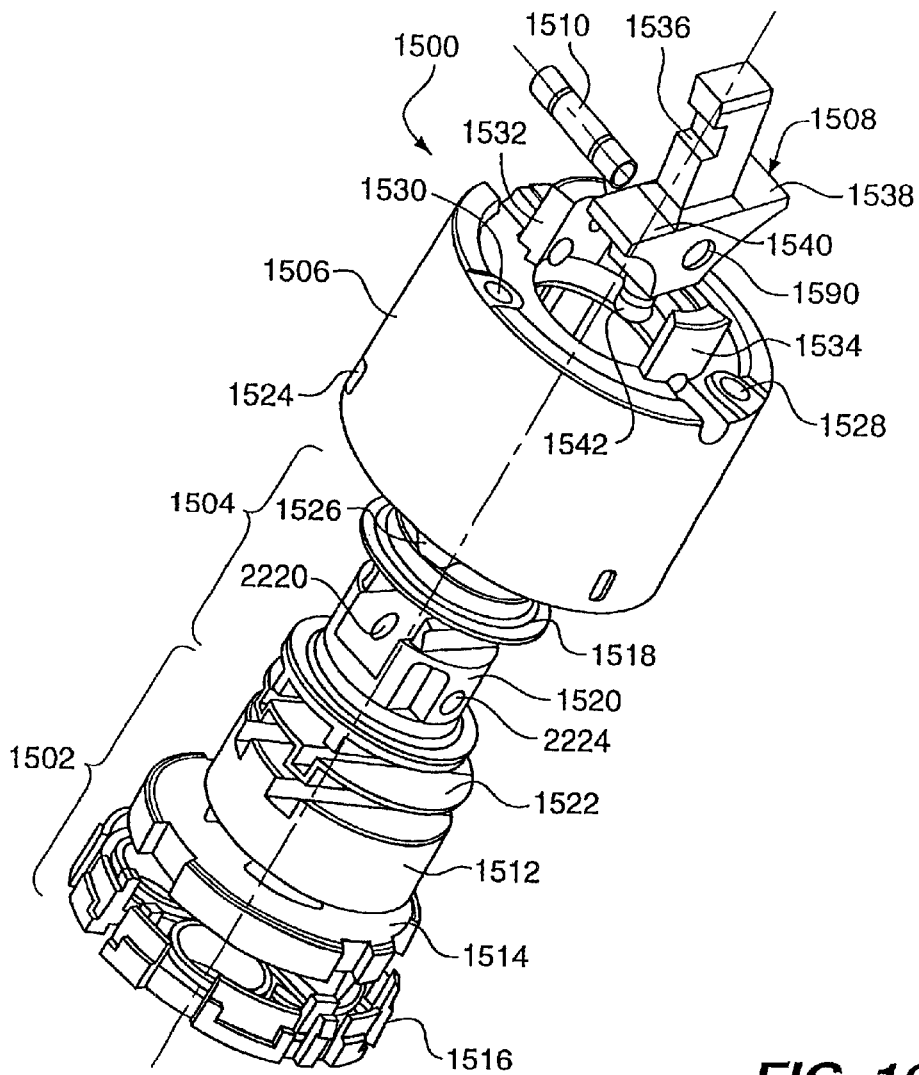
FIG. 15 depicts a right top perspective assembly view of a second embodiment of a five way valve for use according to the present invention.

FIG. 15 depicts a right front perspective assembly view of a second five way valve 1500 that can be substituted for the valve 400 shown in FIG. 4. Valve 1500 is improved with respect to valve 400 due to a positive locking feature that assures the flow of filtered water only in a specialized position. A plate valve assembly 1502 is used to control the flow of water in much the same manner as for valve 400 shown in FIG. 4. An actuator linkage assembly 1504 permits rotation and shifting of components of valve assembly 1502 with respect to one another. A main housing 1506 contains and protects the internal components of valve 1500. A four-armed rocking cam lever 1508 functions as the primary mover for actuator linkage assembly 1504. A pin 1510 connects the cam lever 1508 with actuator linkage assembly 1504.

Figure 16:
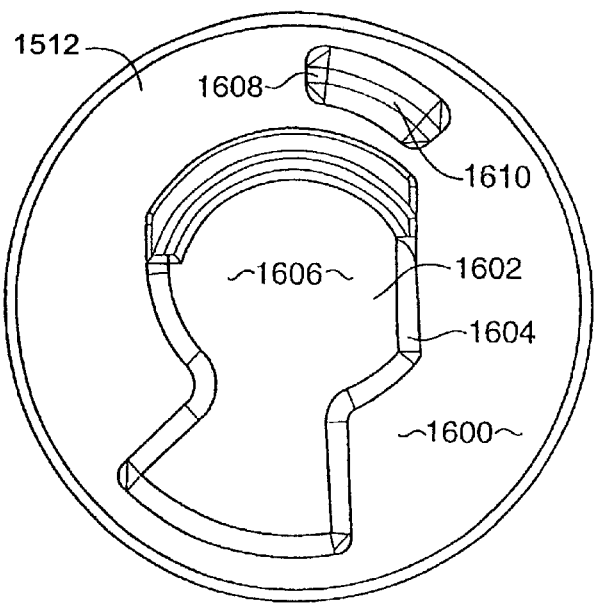
FIG. 16 depicts a top rear plan view of a top plate for use in the valve assembly of FIG. 15.

As depicted in FIG. 15, plate valve assembly 1502 contains a slidable top plate 1512, a fixed bottom plate 1514, and a bottommost manifold connector plate 1516. FIG. 16 is a rear bottom plan view of top plate 1514. Top plate 1512 presents a flat sliding surface 1600 that is preferably coated with a thin coat of hydrophobic grease for sealing engagement against bottom plate 1514 (see FIG. 15).

FIG. 16 depicts a bottom rear plan view of top plate 1512. A flat sliding surface 1600 is covered with a silicon-based hydrophobic grease to provide sealing engagement against bottom plate 1514 (see FIG. 15). A central keyhole-shaped recess 1602 is circumscribed by a beveled ramp 1604 extending from sliding surface 1600 to an interior curved wall 1606. Similarly, a beveled wall 1608 connects an elongated arcuate quasi-rectangular filtration water recess or via 1610 with surface 1600. Recesses 1602 and 1610 do not penetrate top plate 1512.

Figure 17:
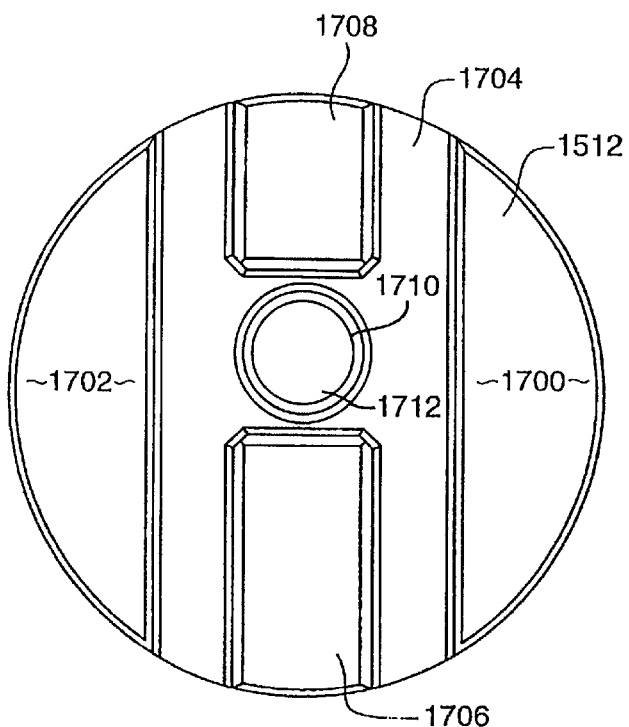
FIG. 17 depicts a bottom rear plan view of the top plate shown in FIG. 16.

FIG. 17 depicts a top rear plan view of top plate 1512. Flat semicircular outer surfaces 1700 and 1702 border opposite sides of an H-shaped channel 1704. Flat surfaces 1706 and 1708 are at an equal level with respect to flat surfaces 1700 and 1702 to complete the H-shaped channel 1704. A central cylindrical recess 1710 has a central opening 1712 for engagement with cam lever 1508 (see FIG. 15).

Figure 18:
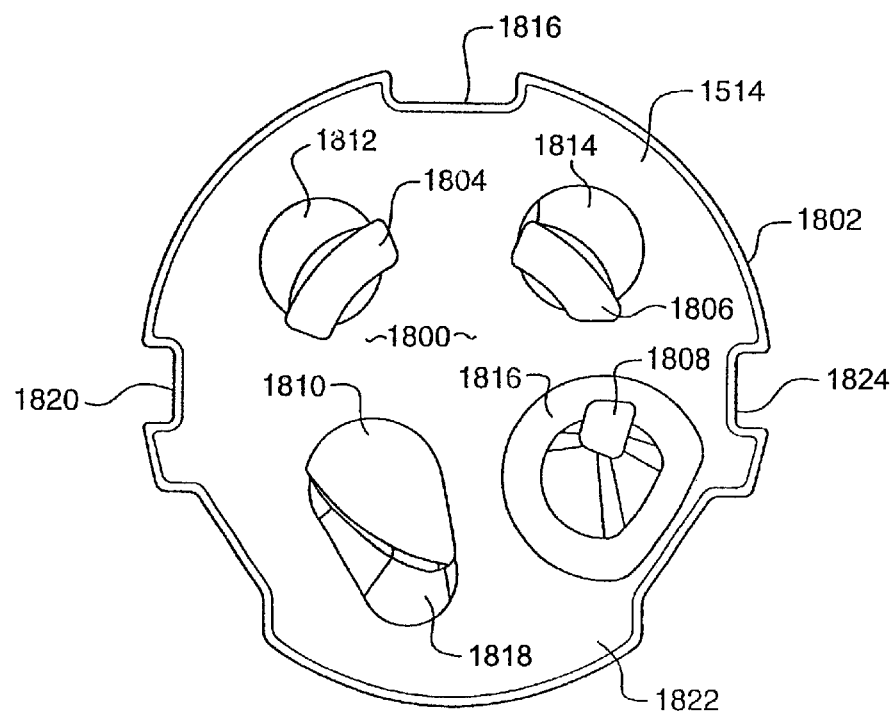
FIG. 18 depicts a top rear plan view of a bottom plate for use in the valve assembly of FIG. 15.

FIG. 18 depicts a bottom rear plan view of bottom plate 1514 (see also FIG. 15). A flat surface 1800 is pressed in sealing engagement against manifold connector plate 1516. A plurality of fixed openings 1804, 1806, 1808, and 1810 extend through bottom plate 1514 including a hot water inlet 1804, cold water inlet 1806, cold water to filter outlet 1808, and mixed water outlet 1810. A plurality of arcuate walls 1812, 1814, 1816 and 1818 rise to connect the corresponding openings 1804, 1806, 1808, and 1810 with flat surface 1800 and to fix the bottom plate 1514 in position. A plurality of vertical notches 1816, 1818, and 1820 are formed in the outer margin of bottom plate 1514 to permit excess water or leakage to run off from within valve 1500.

Figure 19:
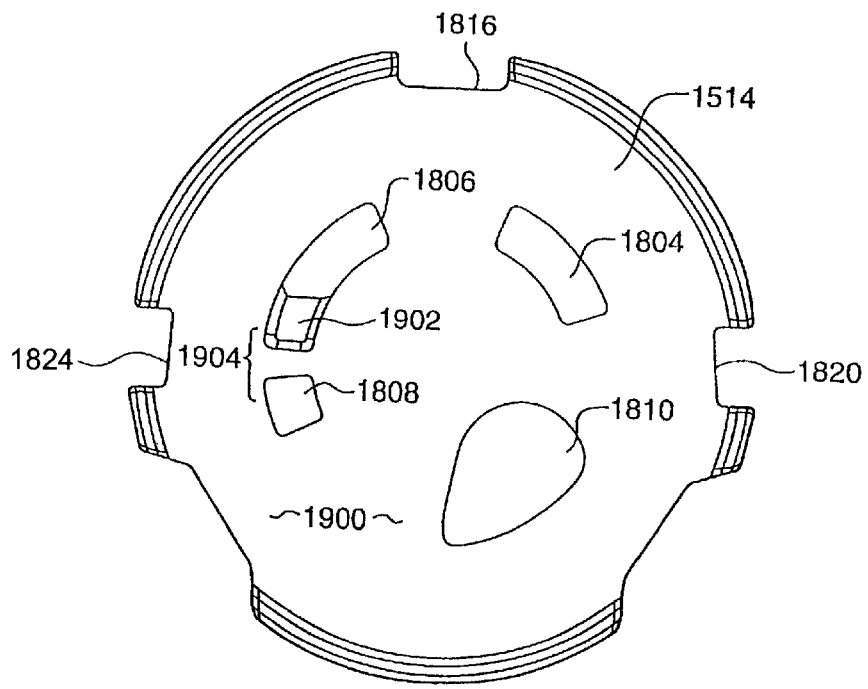
FIG. 19 depicts a bottom rear plan view of the bottom plate shown in FIG. 18.

FIG. 19 depicts a top rear plan view of bottom plate 1514. A flat surface 1900 is covered with silicon-based hydrophobic grease for sealing engagement against flat surface 1600 of top plate 1512 (see also FIG. 16). Cold water to filter inlet contains a groove 1902 extending towards cold water to filter outlet 1808. Quasi-rectangular filtration water via 1610 has sufficient dimensions to bridge the separation distance 1904 between groove 1902 and cold water to filter outlet 1808. Similarly, the keyhole-shaped recess 1602 (see also FIG. 16) has dimensions sufficient to bridge hot water inlet 1804 and/or cold water inlet 1806 with and mixed water outlet 1810 in selectively positionable manner to provide for the flow of unfiltered hot water, cold water or mixed water through mixed water outlet 1810. The motion of top plate 1512 relative to the fixed bottom plate 1514 is constrained to prevent the keyhole-shaped recess 1602 from transferring hot water to filter outlet 1808.

Figure 20:
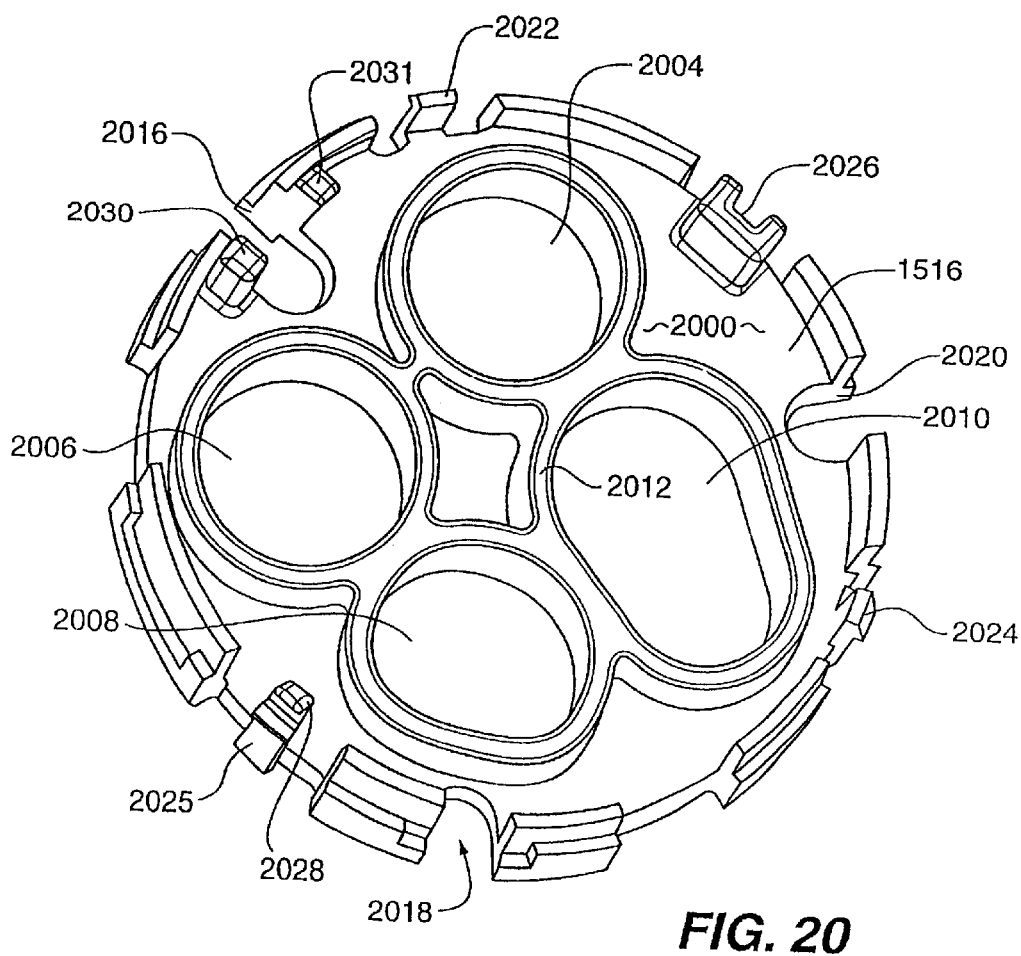
FIG. 20 depicts a top plan view of a manifold connector plate for use in the valve assembly of FIG. 15.

FIG. 20 depicts a top plan view of manifold connector plate 1516 (see also FIG. 15). Manifold connector plate 1516 presents a flat surface 2000 proximate surface 1800 of bottom plate 1514 (see also FIG. 18). A plurality of apertures 2004, 2006, 2008, and 2010 extend through manifold connector plate 1516 in alignment with the corresponding openings 1804, 1806, 1808 and 1810 for the passage of water. For example, openings 2010 and 1810 provide for the passage of mixed water, and openings 1804 and 2004 provide for the passage of incoming hot water. A groove 2012 receives a flat elastomeric seal (not depicted in FIG. 20) to prevent the leakage of water between surfaces 2000 and 1800. A similar elastomeric seal (not depicted in FIG. 20) is provided on the opposite side of manifold connector plate 1516. Slots 2016, 2018, and 2020 are generally in alignment with channels 1816, 1818, and 1820 to permit excess water or leakage to exit valve 1500. A plurality of male snap connector elements 2022 and 2024 interlock with corresponding structure on main housing 1506. Fixation noses 2026, 2028, 2030, and 2031 are used to fix the position of bottom plate 1514 (not depicted in FIG. 20).

Figure 21:
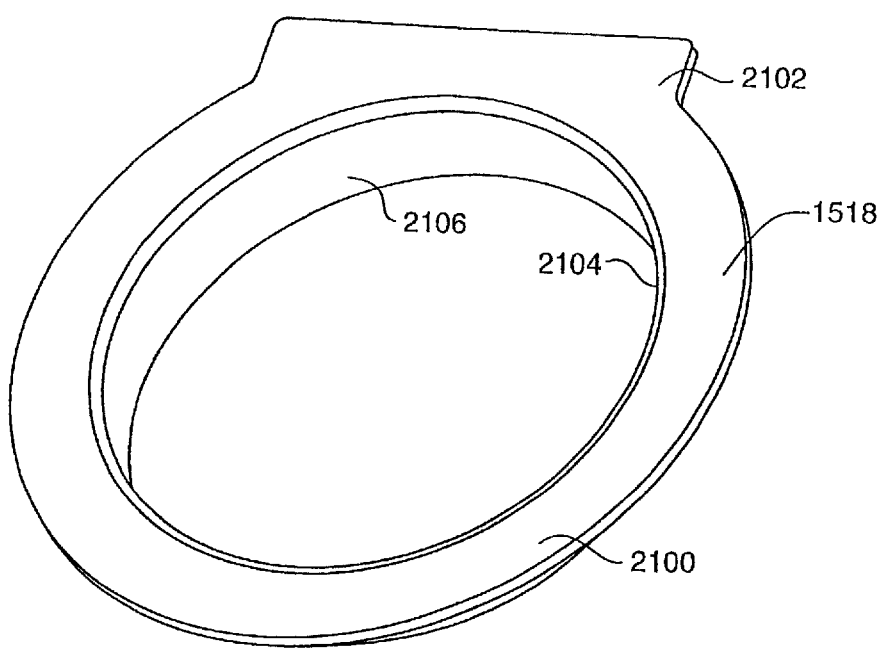
FIG. 21 depicts a top perspective view of a collar for use in the valve assembly of FIG. 15.

Returning now to FIG. 15, it is seen that the actuator linkage assembly 1504 includes a collar 1518, a pivot holder 1520, and force transfer plate 1522. FIG. 21 depicts a bottom front perspective view of the collar 1518. Collar 1518 includes a flat bottom wall 2100 having a rectangular nose 2102 for engaging corresponding slotted structure within main housing 1506 to prevent rotation of collar 1518 relative to housing 1506. The interior dimension of bottom wall 2100 forms a circular hole 2104 meeting a vertically raised cylindrical wall 2106.

Figure 22:
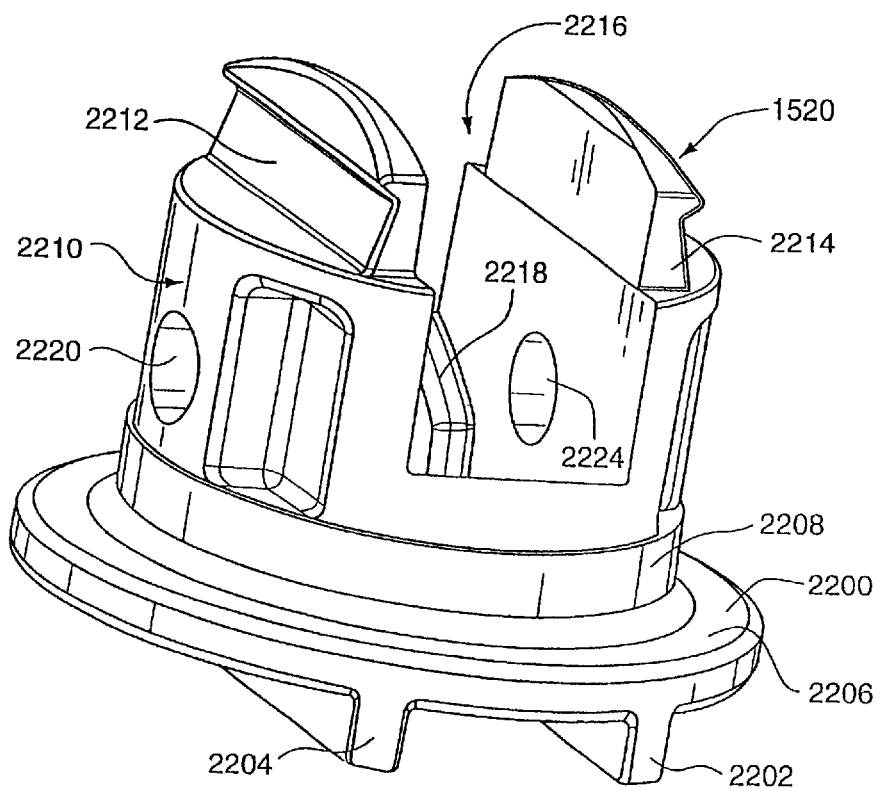
FIG. 22 depicts a top perspective view of a pivot holder for use in the valve assembly of FIG. 15.

FIG. 22 provides additional detail with respect to pivot holder 1520. A bottom shoulder 2200 contains a pair of parallel extending rectangular bosses 2202 and 2204. A sliding surface 2206 abuts bottom wall 2100 of collar 1518 (see also FIG. 21). A vertically raised cylinder 2208 contacts vertically raised sidewall 2106 of collar 1518 and is freely rotatable with respect to sidewall 2106. A central platform 2210 contains a pair of upwardly raised rotational ears 2212 and 2214 on opposite sides of a through opening 2216. A ramp 2218 limits the vertical rocking motion of cam lever 1508 (see also FIG. 15) with respect to pivot holder 1520. Holes 2220 and 2224 have sufficient dimensions to receive pin 1510.

FIG. 23 provides additional detail with respect to force transfer plate 1522. A pair of channels 2300 and 2302 receive the corresponding pair of rectangular bosses 2202 and 2204 (see also FIG. 22) for the transfer of torsional forces from pivot holder 1520 to top plate 1512. The bottom rectangular protrusions 2304 and 2306 are received within the corresponding areas of H-shaped channel 1704 in top plate 1512 (see also FIG. 17). A descending frustoconical hole 2308 provides continuity above a corresponding central opening 1712 in top plate 1512 for engagement with cam lever 1508.

As depicted in FIG. 15, main housing 1506 contains snap locking structure, e.g., snap connector 1524, for interengagement with the snap connectors 2022 and 2024 of manifold connector 1516. A plurality of holes, e.g., holes 1528 and 1530, permit the [passage of bolts or carriage screws to retain the valve 1500 within a faucet housing (not depicted in FIG. 15). A pair of centrally raised bosses 1532 and 1534 limit the horizontal rotational movement of cam lever 1508 relative to main housing 1506.

Cam lever 1508 includes a front facing slotted bar 1536 for engagement with a set screw on a faucet handle (not depicted in FIG. 15). Cam lever 1508 has a pair of outwardly tapered wings 1538 and 1540 and a downwardly extending rocker ball 1542, which is received in frustoconical hole 2308 (see also FIG. 23) to impart sliding motion to top plate 1512 through force transfer plate 1522 by the vertical rocking motion of cam lever 1508. The pin 1510 is engaged into the hole 1590 and into the holes 2220 and 2224 to impart rotational motion to top plate 1512 through force transfer plate 1522 by the rotational motion of cam lever 1508.

FIG. 24 depicts a midsectional view of an assembled valve 1500. FIG. 24 demonstrates that the vertical rocking motion of cam lever 1508 about pin 1510 causes rocker ball 1542 to push top plate 1512 in a horizontal sliding motion relative to bottom plate 1514. Cam lever 1508 has a neutral position 2400 at vertical. As depicted in FIG. 24, cam lever 1508 is rocked fully forward along an approximate 12.5° arc to position 2402 with wing 1540 against abutment 2404. Similarly, cam lever 1508 can be rocked fully rearward along an approximate 8° arc to position 2406 placing wing 1538 against abutment 2408. The corresponding sliding motion of top plate 1512 relative to bottom plate 1514 places the plates in selective alignment for the flow of hot, cold, mixed, or filtered water. The full rearward position corresponds to the maximum volume of hot, cold or mixed water. The full forward position is required before the valve can be selectively positioned to flow filtered water.

Figure 25:
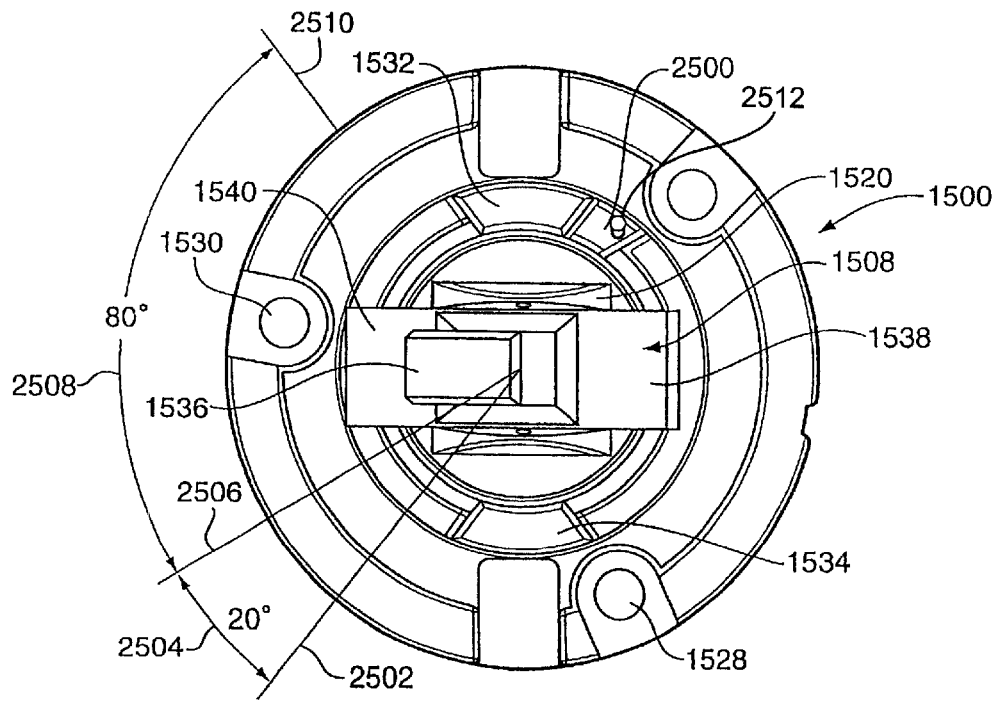
FIG. 25 depicts a top plan view of the valve corresponding to FIG. 15 with a mechanism for limiting rotational movement of central components in the valve.

FIG. 25 depicts a top plan view of the assembled valve 1500. Rotational movement of cam lever 1508 is limited by the abutment of wing 1538 against bosses 1532 and 1534. When cam lever 1508 is rocked fully forward as shown in FIG. 24, it is possible for the bottom surface of wing 1538 to ride above ramp 2500 to rotational position 2502 for the flow of filtered water with filtration water via 1610 bridging distance 1904 (see also FIGS. 16 and 19). Clockwise rotation of cam lever 1508 along 20° arc 2504 diminishes the flow of filtered water towards position 2506. At position 2506, there is no flow until the cam lever is rocked rearward to place recess 1602 bridging openings 1804, 1806, and 1810 (see also FIGS. 16, 18, and 19). The flow of unfiltered water is pure cold water when cam lever 1508 is fully rearward at position 2506 and is mixed water as cam lever 1508 is rotated clockwise from position 2506 along 80° arc 2508 towards position 2510. The flow of water at position 2510 is pure hot water. This arrangement provides safety by assuring that the flow of filtered water comes only from a position of cam lever 1508 that is rocked fully forward and rotated far to the right. The filter is protected from exposure to hot water because it is impossible to flow hot water to the filter.

Figure 26:
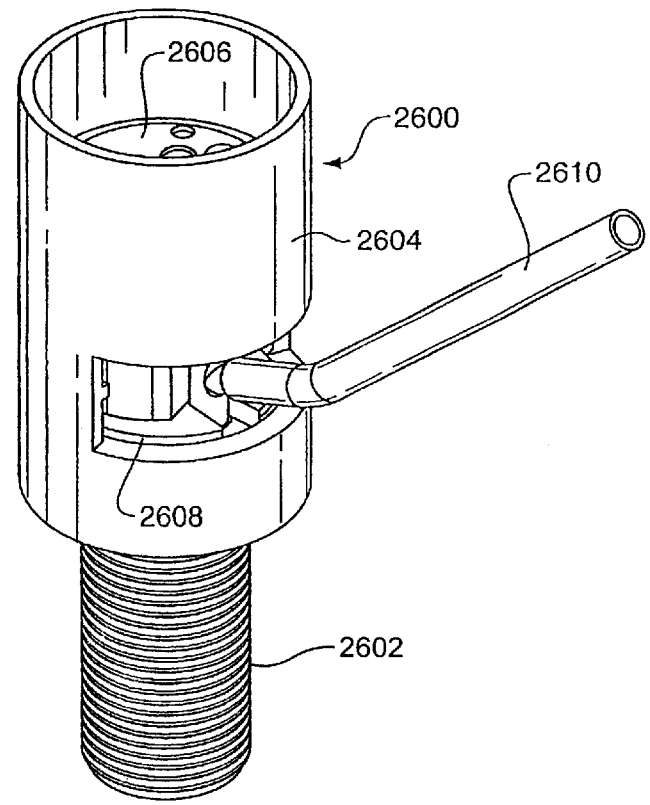
FIG. 26 depicts a manifold assembly for use in providing water to and accepting water from the valves shown in FIG. 4 or 15.

FIG. 26 depicts a manifold assembly 2600 that is used to dispense water from valve 1500. An externally threaded tube 2602 is used to anchor the assembly in a sink deck (not depicted in FIG. 26). A cylindrical exterior housing 2604 contains fixed manifold components 2606 and a slot 2608 permitting the passage of an flexible filtered water spout 2610. Manifold components are affixed to tube 2602, while exterior housing 2604 is free to rotate in axially centered motion relative to manifold components 2606.

Figure 27:
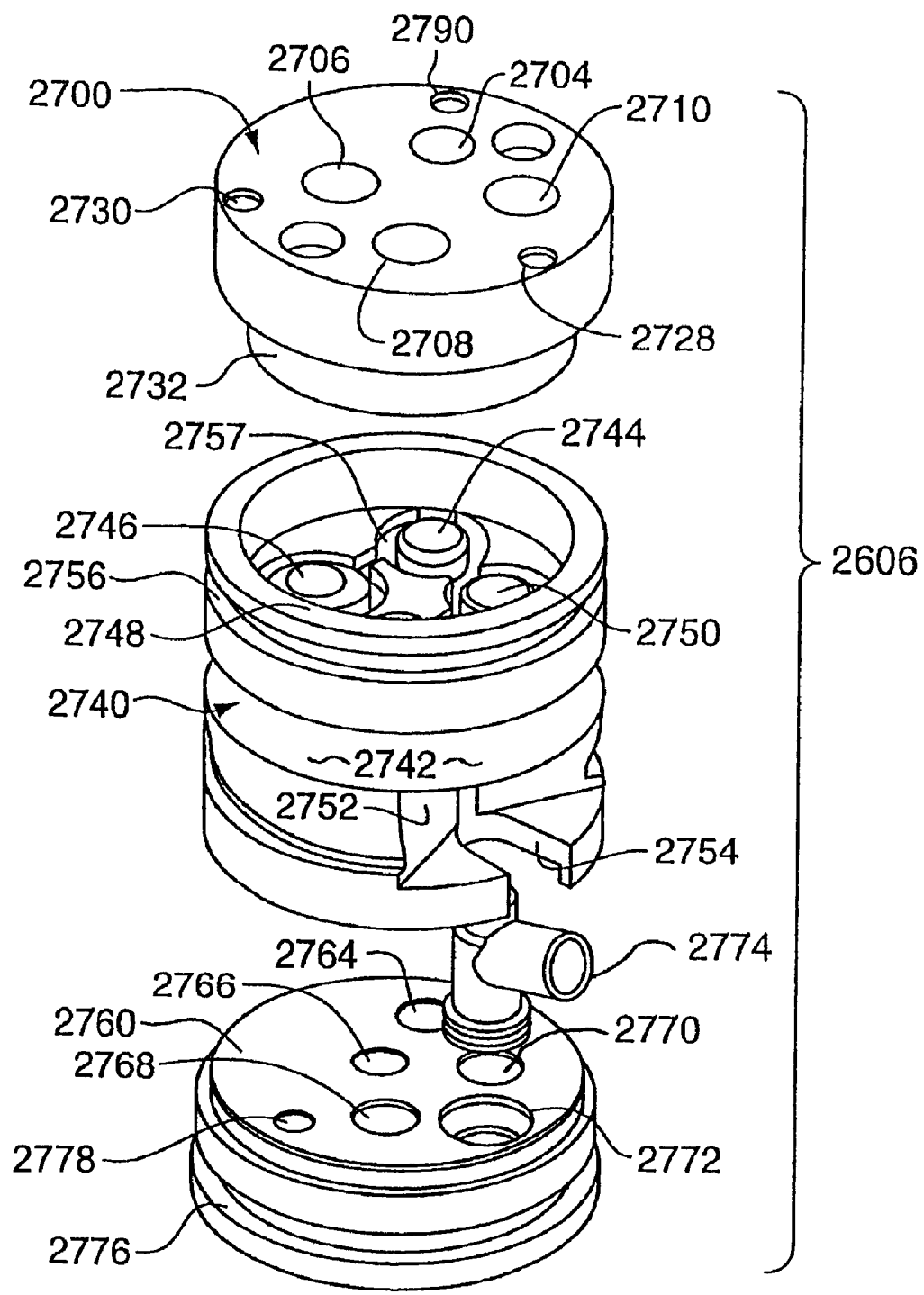
FIG. 27 depicts an assembly view of manifold components for use in the manifold of FIG. 26.

FIG. 27 depicts an assembly view of the manifold components 2606. A top disk 2700 contains a plurality of holes 2704, 2706, 2708, and 2710 corresponding to apertures 2004, 2006, 2008, and 2010 in manifold connector plate 1516 for the flow of cold water, cold water to filter, hot water, and mixed water. For example, openings 2710, 2010 and 1810 provide for the passage of mixed water, and openings 2704, 1804 and 2004 provide for the passage of incoming hot water. Holes 2728, 2730, and 2790 receive bolts to attach valve 1500 to top disk 2700. A narrow cylindrical section 2732 is adhered to and received within middle section 2740.

Middle section 2740 contains a cylindrical outer wall 2742. The interior of middle section 2740 contains a plurality of holes 2744, 2746, 2748, and 2750 in alignment with holes 2704, 2706, 2708, and 2710 for the passage of hot water, cold water, cold water to filter and mixed water. A triangular slot 2752 with notch 2754 is formed into outer wall 2742. A channel 2756 circumscribes outer wall 2742 for the receipt of an O-ring seal (not depicted in FIG. 27). A flat elastomeric seal (not depicted in FIG. 27) is poisoned within recess 2757 to seal against the bottom face of narrowed cylindrical portion 2732.

A bottom disc 2760 contains a plurality of holes 2764, 2766, 2768, and 2770 corresponding to holes 2704, 2706, 2708, and 2710 for the passage of hot water, cold water, cold water to filter and mixed water. Hole 2772 receives water from the filter and supplies the same to angled T connector 2774. T connector 2774 is used to supply filtered water outlet. Holes 2764, 2766, 2768, 2770, 2772 and 2778 have corresponding threaded nipple structure (not depicted in FIG. 27) to facilitate connection to tubing in a conventional manner. A channel 2776 receives an O-ring seal (not depicted in FIG. 27) for sealing engagement against the interior surfaces of housing 2604 (see also FIG. 26).

Figure 28:
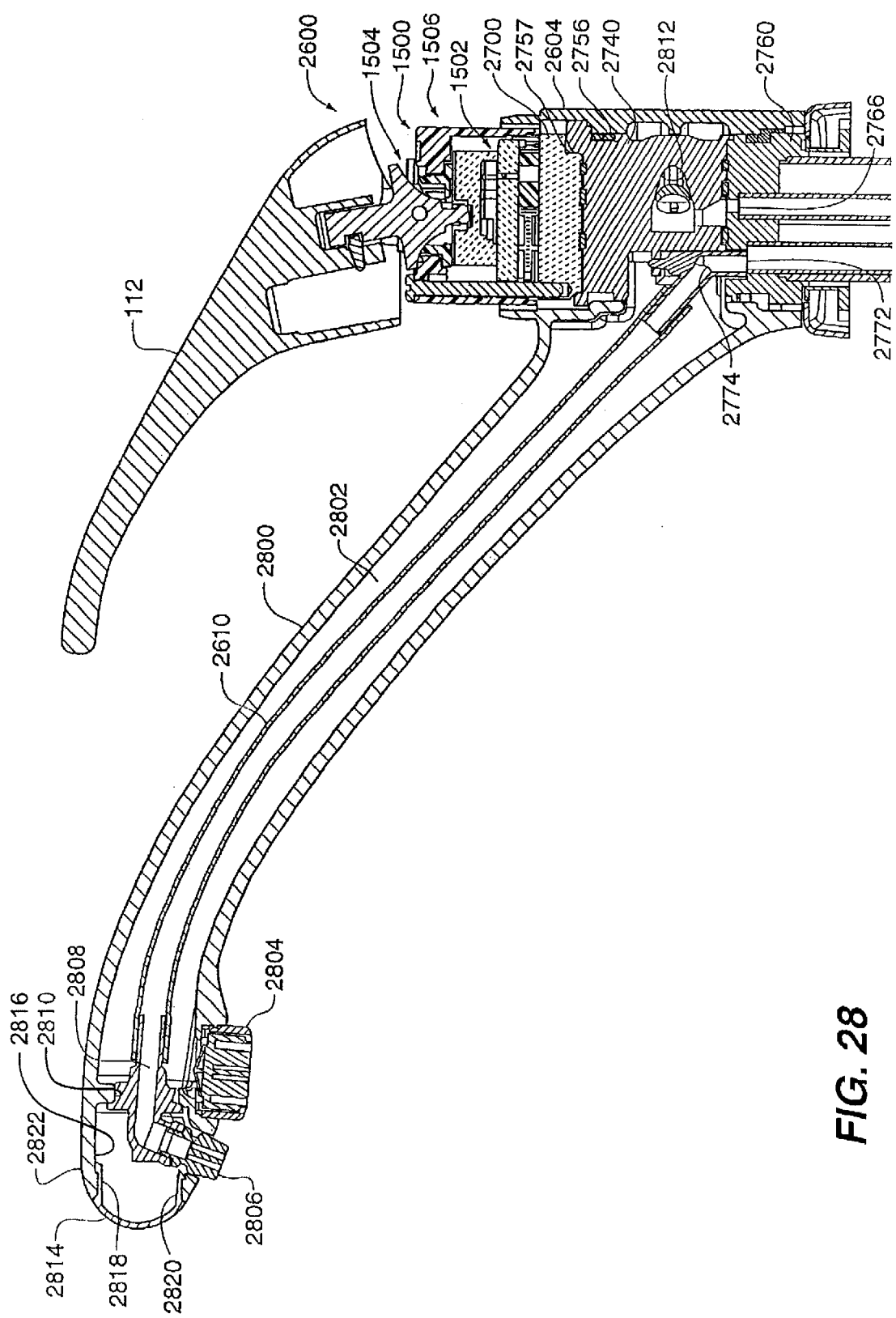
FIG. 28 depicts a midsectional view of a dual discharge faucet including the components of FIGS. 26 and 27.

FIG. 28 is a midsectional view providing additional detail with respect to the assembled manifold assembly 2600. An external faucet spout 2800 circumscribes filtered water spout 2610 and is affixed to exterior housing 2604 to provide annular passage 2802 communicating with a conventional aerator outlet 2804, which is used to dispense unfiltered water. Flexible filtered water spout 2610 discharges through a separate discharge opening 2806 that is threadably coupled with an elbow 2808, which is coupled with filtered water spout 2610. An O-ring 2810 seals elbow 2808 against external faucet spout 2800 to block passage 2802. A conventional diverter valve assembly 2812 is operably configured to receive mixed water from hole 2710 (see FIG. 27) and to divert this water to either annular passage 2802 or to a vegetable sprayer (not depicted in FIG. 28) depending upon the selective actuation of the vegetable sprayer in a conventional manner of operation for diverter valves of this type known to those skilled in the art.

A rounded end cap 2814 covers end opening 2816 in the external faucet spout 2800. End cap 2814 snaps into place over end opening 2816 by the action of a plurality of flexible barbed fingers, e.g., fingers 2818 and 2820, upon a corresponding internal rim 2822 on the interior of external faucet spout 2800.

Figure 29:
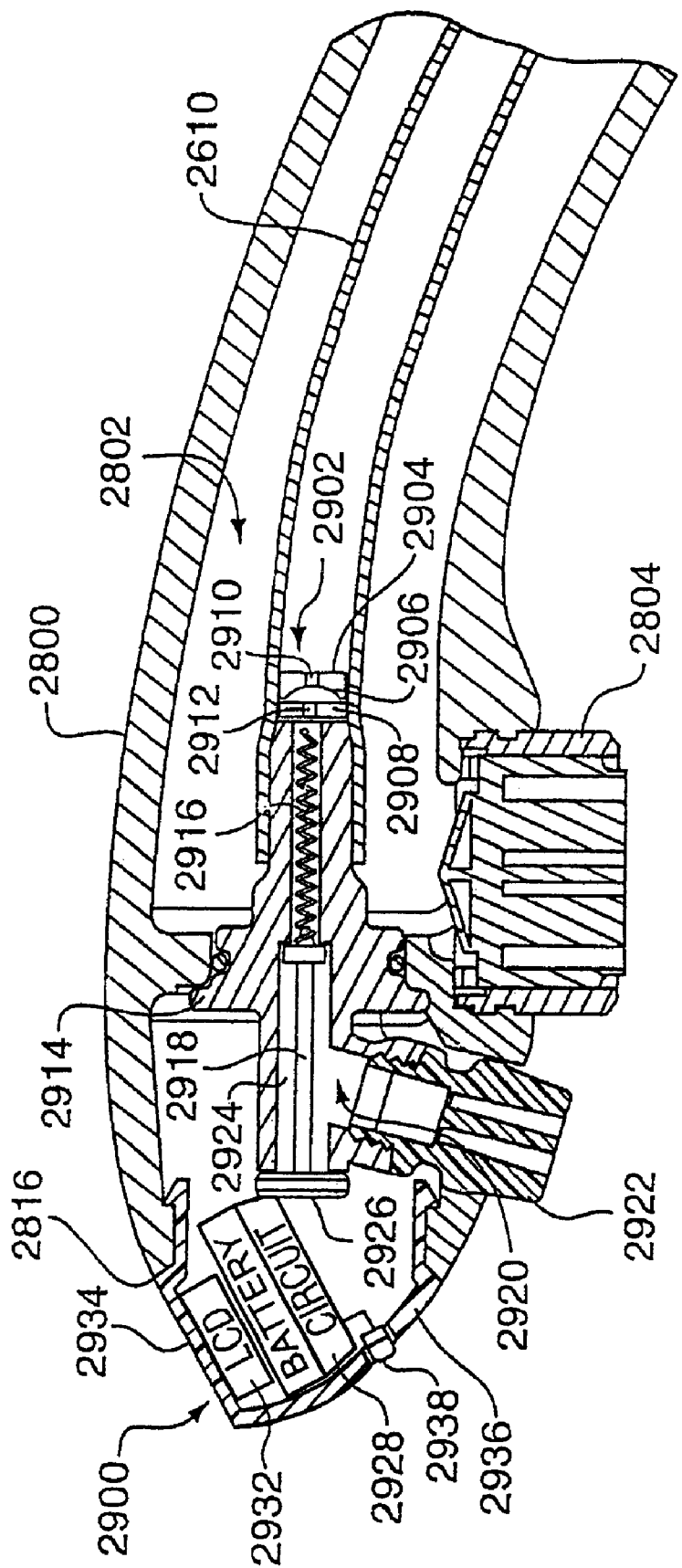
FIG. 29 depicts a midsectional view of the dual discharge faucet shown in FIG. 28, except the faucet has been retrofitted with an electronic end of filtration life indicator.

FIG. 29 depicts a filter end of life indicator assembly 2900 that can be installed within end opening 2816 of external faucet spout 2800. A flow control assembly 2902 includes an elastomeric disk 2904 having a concave face 2906 proximate a rigid disk 2908. Elastomeric disk 2904 is operably configured to deform under the influence of pressure within filtered water spout 2610. This deformation under increasing pressure moves concave face 2906 closer to rigid disk 2908, thereby narrowing the crossectional area of aperture 2910 for the purpose of restricting the flow rate under increasing pressure to provide a substantially constant or linear rate of flow within an operable range of pressures. Water passes through hole 2912 and into Y-connector 2914.

Y-connector 2914 contains a pinned spring 2916, which is loaded in tension to bias plunger 2918 towards flow control assembly 2902. A first passage 2920 leads discharge opening 2922, which threadably couple with passage 2920. A second passage 2924 permits plunger 2918 to contact a reed switch 2926. Reed switch 2926 is bonded to second passage 2924 to form a watertight seal. Reed switch 2926 is in electrical contact with a time circuit board 2928, which receives power from battery 2920. A liquid crystal display 2932 is driven by time circuit board 2928, and is visible through a transparent window 2934 in end cap 2936.

In operation, the action of water upon plunger 2918 drives plunger into reed switch 2926. The closing of reed switch 2926 causes time circuit board 2928 to begin tracking time. Time circuit board 2928 converts this time into a volume of flow by simply multiplying the time by the substantially constant rate of flow that is provided by the action of flow control assembly 2902. Time circuit board 2928 then causes a cumulative volume of flow to be displayed on LCD 2934. Time circuit board 2928 may cause other information to be displayed on LCD 2934, including the remaining life of a filter in terms of volume or projected days of remaining life based upon historical consumption patterns. A reset button 2938 can be depressed to reset the accumulated flow volume that is stored in time circuit board 2928.

Figure 30:
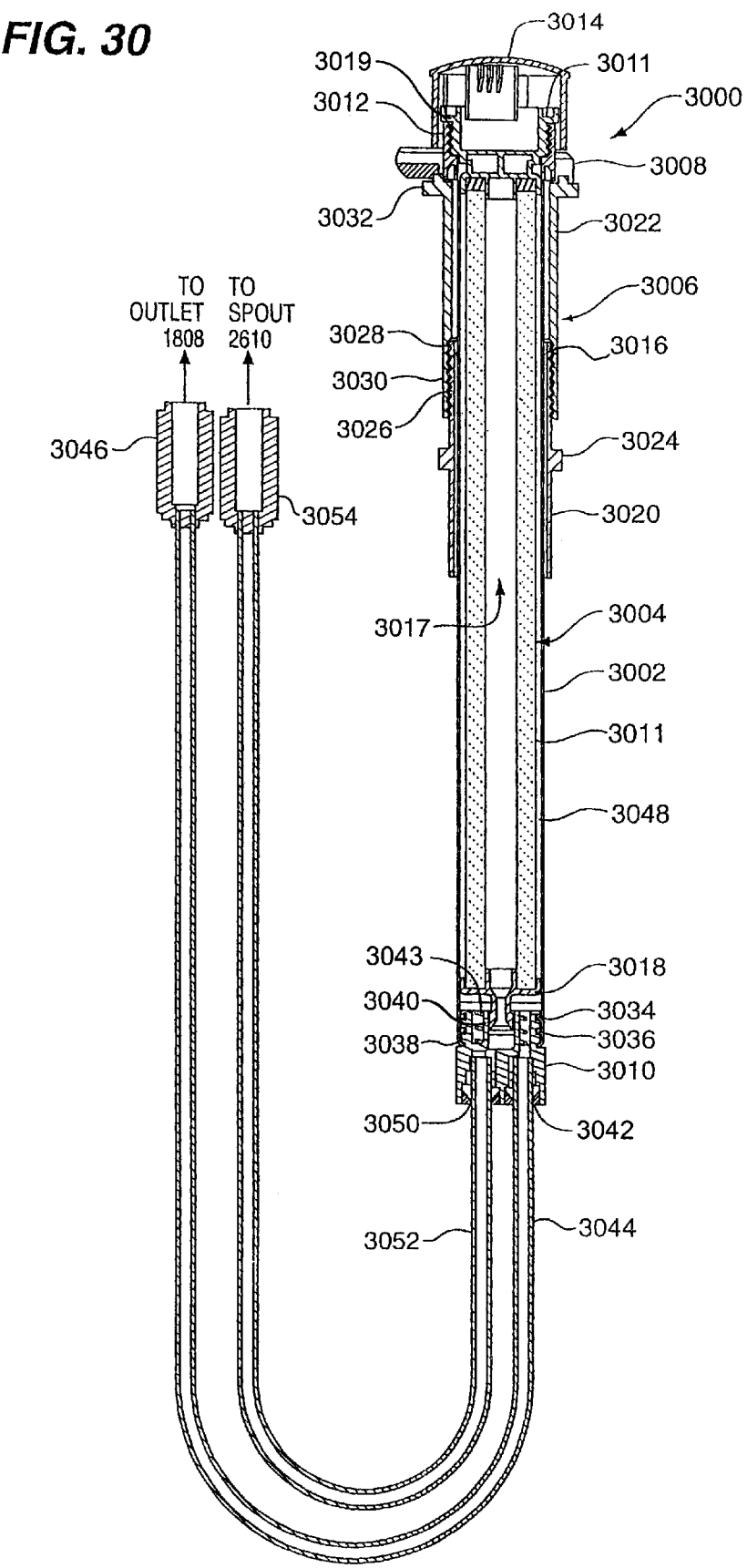
FIG. 30 depicts a midsectional view of a filtration assembly that can be used as an alternative to the filtration assembly shown in FIGS. 10 and 14.

FIG. 30 depicts a midsectional view of a modified escutcheon mounted filter assembly 3000 that can be used in place of the filtration assembly depicted in FIG. 10. A filtration body sleeve 3002 contains a filter core body 3004. A sliding collet assembly 3006 retains filtration body sleeve 3002 in fixed position with respect to escutcheon plate 3008. Escutcheon plate 3008 may be identical to the device shown in FIG. 2, where filtration body sleeve 3002 may be placed in escutcheon 114 or equivalent structures. A specialized end piece assembly 3010 provides for the transfer of water through filter core body 3004 in a radially inboard direction. Thus, filter assembly 3000 does not require features shown on FIG. 2 including water outlet orifice 224 and water inlet orifice 226. These orifices are replaced by end piece assembly 3010.

The filtration body sleeve 3002 is a hollow tube that is sealingly coupled with a female threaded cap 3012 and end piece assembly 3010. A decorative ornamental top piece 3014 covers the female threaded cap 3012. An outboard radial rib 3016 circumscribes filtration body sleeve 3002.

Filter core body 3004 includes a permeable semi-rigid filter tube 3011 that is constructed of filter material. The filter material can be paper or a purely mechanical filtration material, but it is preferred to embed the filtration material with a chemical treatment means. This chemical treatment means can include a chemical scrubber, such as activated carbon or KDF™ material. The chemical treatment means can also include a biocide, such as a halogenated quaternary amine. These chemical treatment means may be mixed with or bound to a plastic matrix for support, e.g., a polyethylene matrix, which functions as a mechanical filter. The interior portion 3017 of filter core body 3004 may be packed with additional chemical treatment means, such as a water softening agent in the form of a hexametaphosphate or tribasic potassium phosphate, and a pH buffer or flavoring agent, e.g., calcium carbonate. Filter core body 3004 is glued or inertia welded at opposite ends to a male nipple 3018 and a male threaded cap 3019.

Sliding collet assembly 3006 is formed in two tubular pieces including a lower piece 3020 and an upper piece 3022. Lower piece 3020 includes a radially outboard shoulder 3024 and a male threaded top 3026. The male threaded top 3026 is formed in a plurality of flexible sections, e.g., section 3028, that each curve inward towards rib 3016 of filtration body sleeve 3002. Upper piece 3022 has a lower female threaded end 3030 and an upper radially outboard shoulder 3032 for engaging escutcheon plate 3008.

End piece assembly 3010 includes a pair of O-ring seals 3034 and 3036 together with a crimp groove 3038 for coupling end piece assembly 3010 with filtration body sleeve 3002. A central female boss 3040 receives and sealingly engages male nipple 3018. Boss 3040 is circumscribed by a spring 3042 that places a compressive load on male nipple 3018 and filter core body 3004. A filtration water inlet 3042 is couples with tube 3044 and connector 3046, which is connected to a source of filtration water, e.g., filtration water outlet 1808 of valve 1500. Filtration water inlet 3042 discharges water into the annular space 3048 between filtration body sleeve 3002 and filter tube 3011. Water flows across filter tube 3011 into the interior space 3017, and enters filtered water outlet 3050 through male nipple 3018. The filtered water travels through tube 3052 and connector 3054, which is operably connected by any means to provide filtered water to a discharge for filtered water, e.g., filtered water spout 2610.

In operation, assembly filters water on a demand basis by the actuation of handle 112 (see FIG. 1). Once filter core body 304 has reached the end of its useful life, it is renewed by prying away the decorative ornamental top piece 3014 and twisting male threaded cap 3019 to unscrew it from sealing engagement with female threaded cap 3012. Filter core body rises with this unscrewing action under the bias of spring 3042 as male nipple 3018 unseats from female boss 3040. A new filter core body is installed by inserting the filter core body into filtration body sleeve 304 and twisting in the reverse direction until the assembly reaches the configuration shown in FIG. 30.

Figure 31:
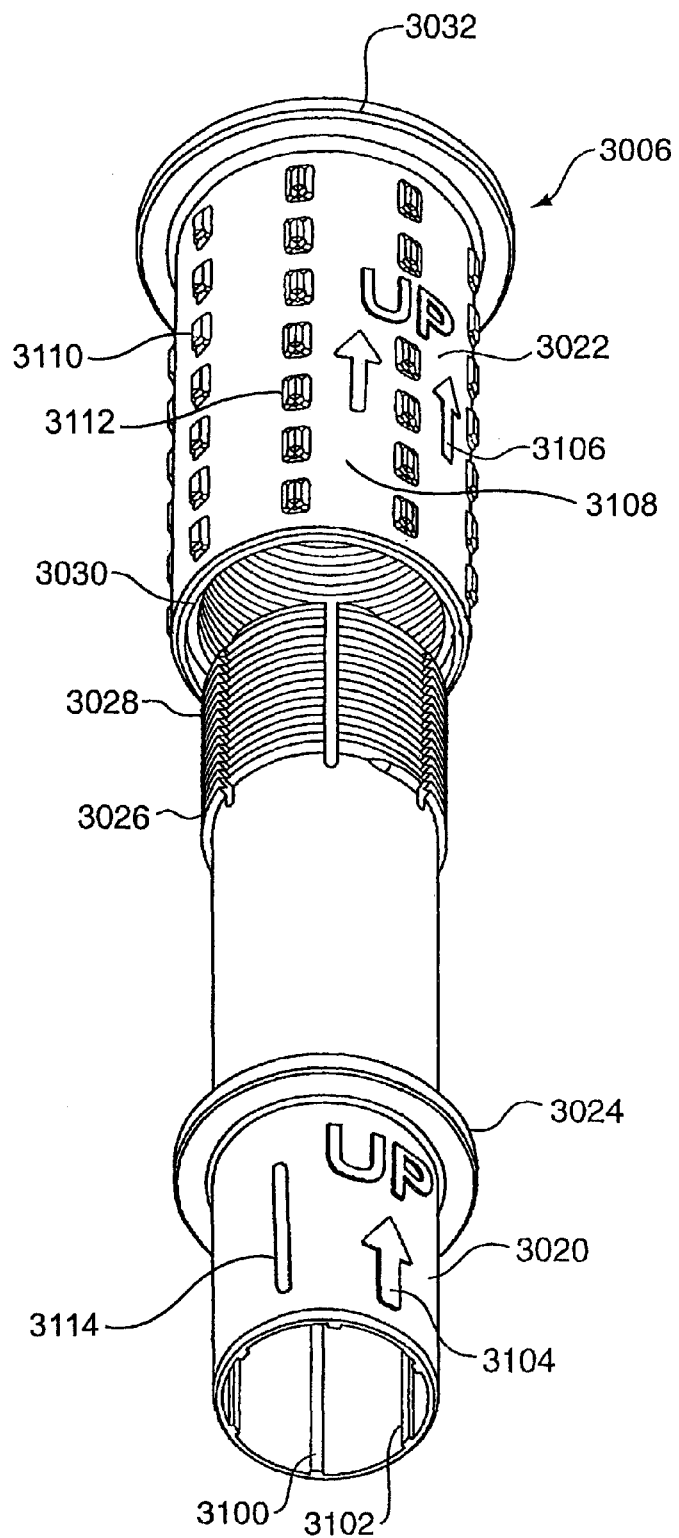
FIG. 31 depicts a sliding collet that is used to mount a filtration body sleeve on an escutcheon.

FIG. 31 provides additional detail with respect to sliding collet assembly 3006. Lower piece 3020 contains a plurality of inner stabilizers, e.g., stabilizers 3100 and 3102 having an inner diameter approximating the regular outer diameter of filtration body sleeve 3002 (see also FIG. 30). Indicia 3104 and 3106 provide a directional orientation for the installation of sliding collet assembly 3006, which is installed from the bottom of filtration body sleeve 3002. Upper piece 3022 is then screwed onto male threaded top 3026 until lower end 3130 engages shoulder 3024. This action permits the lower end of female threaded end 3030 to pass beneath the top of the flexible sections, e.g., section 3028. In this configuration, the flexible sections are free to expand in a radially outboard direction as they open to accommodate rib 3016 while collet assembly 3006 is raised along the exterior of filtration body sleeve 3002. Upper piece 3022 is then rotated relative to lower piece 3020 for the purpose of raising shoulder 3032 into engagement with escutcheon plate 3008 while driving the flexible sections, e.g., section 3028, into engagement with rib 3016. This arrangement places a compressive load on collet assembly 3006 and a corresponding tensile load on filtration body sleeve 3002, thus, locking filtration body sleeve 3002 into a fixed position with respect to escutcheon plate 3008.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

What is claimed is:

1. A water filtration cartridge assembly, arranged for mounting the filter cartridge in a manner in which a water filter body, mounted in a filter cartridge casing, can be replaced, the filter cartridge assembly comprising:

the filter cartridge casing having the water filter body mounted therein, comprising: the filter cartridge casing having a first open end, closeable by a rotatable closure, for introduction and withdrawal of the water filter body;

the rotatable closure for the first open end;

the filter cartridge casing having a second end comprising a first opening for introducing water to be filtered and a second opening for withdrawing filtered water wherein a first side of the water filter body is in fluid communication with the first opening and a second side of the water filter body is in fluid communication with the second opening.

2. A water filtration cartridge assembly of claim 1 adapted for use in concealed mounting of a filtration cartridge below a countertop while providing above counter access to a replaceable water filter body, mounted in the filtration cartridge during water filter body replacement, comprising:

a filter cartridge casing having a first open end for introduction and removal of the replaceable water filter body in the filter cartridge casing, wherein the first open end of the filter cartridge casing is sealingly engageable with a first end of the replaceable water filter body and a second end comprising a fitting having a first opening for introduction of raw water into the filter cartridge and a second opening for removing filtered water;

the replaceable water filter body comprising a cylindrical body comprising filter material having an internal open portion for collecting filtered water, the first end of the replaceable water filter body being sealingly engageable with the first open end of the filter cartridge casing and a second end of the replaceable water filter body comprising a male nipple for sealingly engaging an internal female boss of the filter cartridge casing, in fluid communication with the second opening in the fitting on the lower end of the filter cartridge casing, the male nipple being in fluid communication with the internal open portion of the replaceable water filter body.

3. The water filtration cartridge assembly as set forth in claim 2 including a compression spring biasing said replaceable water filter body toward said first open end of the filter cartridge casing.

4. The water filtration cartridge assembly as set forth in claim 2 wherein said replaceable water filter body includes a central axial bed of at least one chemical purification agent surrounded by a radial mechanical filter.

5. The water filtration cartridge assembly as set forth in claim 2 wherein said replaceable water filter body includes a mechanical filter embedded with means for chemical treatment of water.

6. The water filtration cartridge assembly as set forth in claim 2 wherein said sealing engagement of the upper end of the filter cartridge casing with the first end of the replaceable water filter body includes a twist-channel lock connecting said filter body with said filter cartridge casing.

7. The water filter cartridge assembly as set forth in claim 2 wherein said mounting means comprises an escutcheon configured to retain said water filtration cartridge within a soap hole in a sink.

8. The water filtration cartridge assembly as set forth in claim 2 comprising a mounting means for the filter cartridge including an aperture through a water faucet housing.

9. The water filtration cartridge assembly as set forth in claim 2 further comprising a selectively actuatable valve capable of being positioned to provide flow of filtered and unfiltered water depending upon selective positioning of said valve.

10. The water filtration cartridge assembly as set forth in claim 9 wherein selectively actuatable valve comprises a sliding plate valve including a pair of opposed plates each having a cold water supply orifice, and a hot water supply orifice, one of said plates including a filtration via which is capable of being selectively aligned over the cold water orifice in the opposed plate for transfer of water to said water filtration cartridge.

11. The water filtration cartridge assembly as set forth in claim 2 including a battery powered means for indicating end of life of said replaceable water filter body.

12. The water filtration cartridge assembly as set forth in claim 11 further comprising a spout means adapted to dispense filtered water, wherein said means for indicating end of life is mounted on said spout.

13. The water filtration cartridge assembly as set forth in claim 2 further comprising a means for dispensing water which includes a spout having concentric tubes, respectively, for dispensing filtered and unfiltered water.

14. The water filtration cartridge assembly as set forth in claim 2 further comprising a sliding collet assembly for mounting the filter cartridge.

15. The water filtration cartridge assembly as set forth in claim 13 wherein said sliding collet assembly is adapted to place a tensile load on said water filtration cartridge.

16. The filter cartridge assembly of claim 1 wherein the rotatable closure is arranged on a first end of the water filter body.

17. The filter cartridge assembly of claim 1 having means for biasing the water filter body in a direction toward the opening, closeable by the rotatable closure.

18. The filter cartridge assembly of claim 1, wherein the rotatable closure is a threaded closure.

19. The filtration cartridge assembly of claim 1 wherein the water filter body comprises a cylindrical body comprising filter material wherein the second side comprises an internal open portion for collecting filtered water in fluid communication with second opening.

20. The filtration cartridge assembly of claim 1 wherein the water filter body includes a central bed of at least one chemical water treatment agent surrounded by a radial mechanical filter.

21. The filtration cartridge assembly of claim 1 wherein the water filter body includes a mechanical filter embedded with means for chemical treatment of water.

22. The filtration cartridge assembly of claim 1 wherein the rotatable closure comprises a twist-channel lock.

23. The filtration cartridge assembly of claim 1 wherein the filter cartridge is mounted on an escutcheon configured to retain the filter cartridge within a soap hole in a sink.

24. The filter cartridge assembly of claim 1 including mounting means for the filter cartridge including an aperture through a water faucet housing.

25. The filtration cartridge assembly of claim 1 further comprising a selectively adjustable valve, capable of being positioned to provide flow of filtered and unfiltered water depending upon selective positioning of the valve in fluid communication with the filter cartridge when providing flow of filtered water.

26. The filter cartridge assembly of claim 25, wherein the selectively adjustable valve comprises a sliding plate valve including a pair of opposed plates, having a cold water supply orifice and a hot water supply orifice, one of the plates including a filtration via which can be selectively aligned over the cold water orifice in the opposed plate for transfer of cold water only to the filtration cartridge.

27. The filtration cartridge assembly of claim 1 including a battery powered means for indicating end of life of the replaceable water filter body.

28. The filtration cartridge assembly of claim 27 further comprising a spout means adapted to dispense filtered water wherein said means for indicating end of life is mounted on said spout.

29. The filtration cartridge assembly of claim 1 further comprises a spout having concentric tubes for respectively dispensing filtered and unfiltered water.

30. The filter cartridge assembly of claim 1 further comprising a sliding collet assembly for mounting the filter cartridge.

31. The filter cartridge assembly as set forth in claim 30 wherein the sliding collet assembly is adapted to place a tensile load on the filter cartridge.

* * * * *